United States Patent [19]
Hashimoto et al.

[11] Patent Number: 5,603,020
[45] Date of Patent: Feb. 11, 1997

[54] METHOD FOR DETECTING FILE NAMES BY INFORMING THE TASK OF THE IDENTIFICATION OF THE DIRECTORY ANTECEDENT TO THE FILE

[75] Inventors: Tsuyoshi Hashimoto; Takeshi Suzuki; David Campbell, all of Kawasaki, Japan

[73] Assignee: Fujitsu Limited, Kawasaki, Japan

[21] Appl. No.: 294,960

[22] Filed: Aug. 24, 1994

[30] Foreign Application Priority Data

Oct. 8, 1993 [JP] Japan ................................. 5-253495

[51] Int. Cl.$^6$ ................................................ G06F 17/30
[52] U.S. Cl. ........................ 395/616; 395/670; 364/280; 364/283.1; 364/DIG. 1
[58] Field of Search ................................. 395/600, 650, 395/700; 364/280, 283.1

[56] References Cited

U.S. PATENT DOCUMENTS

| | | | |
|---|---|---|---|
| 5,012,405 | 4/1991 | Nishikado et al. | 395/600 |
| 5,093,779 | 3/1992 | Sakurai | 395/600 |
| 5,325,526 | 6/1994 | Cameron et al. | 395/650 |
| 5,355,497 | 10/1994 | Cohen-Levy | 395/700 |
| 5,367,671 | 11/1994 | Feigenbaum et al. | 395/600 |
| 5,371,885 | 12/1994 | Letwin | 395/600 |
| 5,465,365 | 11/1995 | Winterbottom | 395/600 |

OTHER PUBLICATIONS

R. Duncan "Comparing DOS and OS/2 File Systems" PC Magazine, p. 321 Feb. 14, 1989.
R. Duncan "Design Goals of the New High Performance File System" Microsoft Systems Journal, pp. 1–13, Sep. 1989.
R. Duncan "Using Long Filenames and Extended Attributes, Parts 1 & 2" pp. 317 & 305, Apr. 24 & May 15, 1990.
R. Morris et al "At the Core: An API Comparison" PC Tech Journal, vol. 6, No. 11, p. 62, Dec. 1988.

Primary Examiner—Thomas G. Black
Assistant Examiner—Jack M. Choules
Attorney, Agent, or Firm—Staas & Halsey

[57] ABSTRACT

An operating system for managing a file system having a hierarchical structure stores a directory immediately before a file, when it is opened, to correspond with a file descriptor. When a task specifies the file descriptor, the directory stored to correspond with that file descriptor is presented to the task. The task reads stored information from the directory to detect the file name.

10 Claims, 23 Drawing Sheets

```
/* VARIABLE dfd STORES FILE DESCRIPTOR OF DIRECTORY FOR FILE              */
/* VARIABLE name_rel STORES FILE NAME (NAME RELATIVE TO DIRECTORY)        */ fchdir (dfd) ;/* SHIFT CURRENT DIRECTORY TEMPORARILY TO                   */
             /* DIRECTORY (dfd) FOR FILE BEING                            */
             /* PROCESSED.                                                */
name_dir=etcwd ( ) ;/* OBTAIN NAME OF CURRENT DIRECTORY.                  */
name_abs=strcat (name_dir, name_rel) ;                                  /**/
             /* COMBINE CURRENT DIRECTORY NAME AND FILE NAME (NAME        */
             /* RELATIVE TO DIRECTORY)TO OBTAIN COMPLETE PATH             */
             /* NAME OF FILE.
```

```
GENERATE CHILD TASK.
EXAMINE WHETHER GENERATED TASK IS PARENT TASK OR CHILD TASK
① CHILD TASK:
    IT REPLACES ITSELF WITH PROGRAM FOR PROCESS A FOR EXECUTION
② PARENT TASK:
    IT EXECUTES PROCESSING AS PARENT TASK
```
~79

PROGRAM FOR PROCESS A ~80

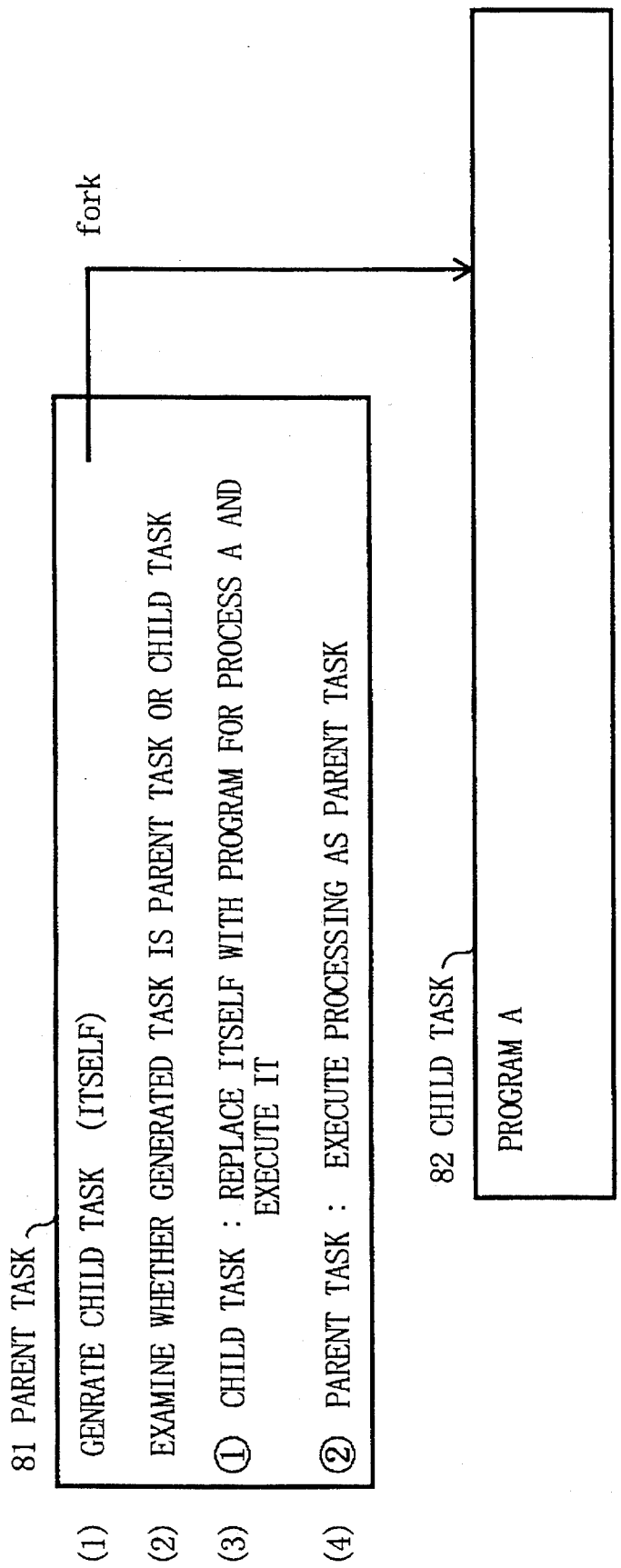
F I G. 22

METHOD FOR DETECTING FILE NAMES BY INFORMING THE TASK OF THE IDENTIFICATION OF THE DIRECTORY ANTECEDENT TO THE FILE

BACKGROUND OF THE INVENTION

1. Field of the Invention

The present invention relates to a file name detecting method for use with an operating system for managing a hierarchically structured file system and a checkpoint and restart method using the file detecting method.

2. Description of the Related Art

FIG. 1 shows an example of a hierarchically structured file system to which the present invention is directed. In this figure, squares indicate files, and circles, intermediate nodes leading to files, directories. Each of the files and the directories is specified and managed with its device and i node numbers. In FIG. 1, the device number is a number 1 or 2 attached to a device (disk), and the i node number is a number attached to a directory or file in each device.

In FIG. 1, file names are stored in directories. For example, the name of a file, x, is stored in the directory e, and the name of a file, v, is stored in both the directories c and g. The name of each directory is not stored in it but stored in an immediately preceding directory. For example, the name of the directory e is stored in the directory d.

There are bidirectional pointers between directories. For files, however, there are pointers only from the side of immediately preceding directories. That is, there are no backward pointers. Thus, for example, the directory e can point to the file x, but the reverse is impossible.

A range of nodes from the root node to each file is referred to as a complete path name. For example, the complete path name of the file x is represented by /a/b/d/e/x. The file v has two complete path names: /a/b/g/v and /a/c/v.

The physical structure of the file system will be described. As described above, both the files and the directories are managed with the device numbers and the i node numbers. Each disk is specified by its own device number and a physical location within each disk is specified by an i node number.

The entire disk is divided into a plurality of blocks with the size of each block fixed. In general, the first block is a spare block, and the second block is a super block. The super block stores management data for the entire file system including, for example, the size of one block, i.e., the number of bytes, and the number of i node blocks.

The other blocks store i node blocks and data blocks. Usually, the first n blocks are used as i node blocks and the remaining blocks are used as data blocks. One i node block stores a plurality of i nodes. From an i node number the physical position of the corresponding i node, i.e., the location of the corresponding block and the relative position of that node within that block, is obtained.

In reality, the files and directories each comprise one i node and one or more data blocks. In both the files and the directories, each i node stores the owner's name, access permission conditions, the date of update, the size of that node (the number of bytes), and others, which serve as management information, and one or more block numbers of data blocks in which data for that i node are stored. The data block number determines the physical position of the corresponding block. The data block number and the i node block number are independent of each other.

In the data blocks of each file, the contents of that file themselves are stored. In contrast, each directory stores in its data blocks its i node number, the i node number of its parent directory, i.e., the upper directory of FIG. 1, and the names and the numbers of i nodes of its child or lower directories.

In an operating system for processing such a hierarchically structured file system (for example, UNIX), an application program (task) specifies the name of a file prior to file processing to request the operating system to open that file. For example, the application program specifies the complete path name /a/b/d/e/x to request the operating system to open the file x.

FIG. 2 is a flowchart for the process of opening a file by the operating system. FIG. 3 shows management tables created when the process is carried out.

When requested by the application program 8, (FIG. 3) to open a file, the operating system searches the file system 3 for the program-specified file, then makes that file ready for access to and returns a file descriptor for the specified file to the application program 8.

The process will be described with reference to the flowchart of FIG. 2. In step S10, a search is made of the file system for a file with the specified name. In practice, the device number and the i node number of the file are obtained. In subsequent step S11, a file management table 4 (see FIG. 3) for that file thus obtained is created to store the device number and i node number of the specified file.

Within the operating system, a pointer to the file management table 4 created in step S11 is stored in a task-to-file correspondence management table 5 of FIG. 3. This table also stores data regarding to what extent the file has been read or written. In subsequent step S13, an entry is added to a file descriptor management table 7 in a task management table 6 of FIG. 3, and a pointer to the task-to-file correspondence management table 5 created in step S12 is stored in the table 7. In step S14, the added entry, e.g., an entry number, is presented to the open-requesting application program (task A) 8 as a file descriptor, thereby terminating the file opening process.

The application program 8 subsequently specifies the file descriptor for the file opened by the opening process of FIG. 2 and requests that the operating system process the file. That is, once the file has been opened, the file name is no longer used in accessing that file. Instead, the operating system follows the control tables in accordance with the specified file descriptor, accesses the file via the file management table 4, and carries out specified processing on that file. At this point, the operating system carries out the processing without storing the file name in its main storage. In other words, the operating system has no means of knowing the corresponding file name from any file descriptor.

Hereinafter, program checkpoint and restart processing, which is the other subject of the present invention, will be described. The checkpoint and restart processing is a method which, by saving the intermediate status in the middle of execution of a program for providing against the occurrence of some abnormality, enables the program to restart from the point at which a checkpoint was taken in the event of abnormality, thereby avoiding reexecuting the entire program from the beginning.

The checkpoint and restart processing is used not only for providing against abnormality but also for executing a program for a long time, for example. That is, the checkpoint and restart facility is also used in the event that, when the program processing will not terminate in a day, the program execution is terminated at the end of the day and the restart is made the next day from the point at which the checkpoint was taken the previous day.

The checkpoint and restart processing includes a process of taking a checkpoint and a process of restarting. The checkpoint taking process is a process of saving the status at a point when a program is being executed. Data to be saved include the contents of the program and its management information (for example, the position of the point of interruption) and the contents of a file and its management information (for example, the access location and access status of the file).

The restart process is a process which, in the event of abnormality, restores the program and the environment in which it was executed, on the basis of information saved at a point when a checkpoint was taken and restarts processing from the state at the point at which the checkpoint was taken.

In prior art, how a program treats a file that is open at a point at which a checkpoint is taken depends uniquely on an attribute of that file. That is, one of the following three file treatments is uniquely applied: (1) on restart the writing of the file begins from a position at a time a checkpoint was taken; (2) all the contents of the file are saved at the time of checkpoint and restored on restart; and (3) the system restores no file(s).

For this reason, during job execution, how to treat each file at a checkpoint cannot be changed regardless of data attribute. In particular, when a lengthy job is carried out, individual files cannot be treated separately during job execution because the system environment may vary greatly between the time that the job was started and the time that a checkpoint was taken. Further, even files of the same attribute cannot be treated differently even if it is desired that they be treated differently by a checkpoint-to-be-taken program.

In the checkpoint taking process in the operating system using such a hierarchically structured file system as described in connection with FIG. 1, since the checkpoint-oriented to-be-taken program in which checkpoints are taken cannot know the name of a file being processed, a method is used which saves the device and i node numbers of the file being processed and other management information needed for file restoration and restores that file on restart.

In the hierarchically structured file system described in connection with FIG. 1, once a file has been opened, access to that file is obtained by a file descriptor, and the name of that file cannot be used at all.

After a file has been opened, access to that file (for the purpose of reading or writing) is permitted simply by specifying a file descriptor. In some cases, however, the name of the file would also be needed. For example, when an error occurs while a given file is being processed, it will sometimes be desired to output a message containing the name of that file in such a form that an error has occurred when specific a file is being processed.

With a hierarchical file system, it is impossible to backward trace an open file to a directory which directly points to that file. The operating system also has no memory of the name of the open file. Therefore, when the name of a file is needed after it has been opened, conventional application programs use either of the following methods.

(1) When opening a file, a program operating within a task stores a correspondence between a file name (for example, a complete path name) and a file descriptor in the form of a table and, when the file name is needed, looks up the file name in the table according to the file descriptor as key.

(2) In the case of an existing program which does not create such a correspondence table as described above, it retrieves a file that a task may open by a file descriptor as a key to obtain its name.

The above methods both have problems. With the method (1), a program within a task must manage a correspondence between file descriptors and file names, which makes processing complex. If a program for opening a file and a program for processing an open file differ, they will be required to decide an interface as to how to manage a correspondence between file descriptors and file names. In particular, if an existing program adapted to accept only file descriptors for processing necessitates file names later (this is due to, for example, addition of a facility), it will be needed to change not only it but also another program (a file opening program) so as to manage the file-name-to-file-descriptor correspondence. If changes cannot be made to the other program (for example, where it is a third party's program and its source program is not available), the method cannot be applied.

With the method (2), all files that a task may process need to be retrieved (including files opened by that task and files opened by a parent task). Unless task activation conditions are known, the whole file system has to be searched, which increases retrieval time.

If a table in which a correspondence between keys that can be known from file descriptors and file names has been recorded for all files were set up beforehand, then fast retrieval would be permitted. In principle, however, it is impossible for a program within a task to manage the table so that it will be correct all the time. That is, a program within a task cannot know the name of a file opened by another task. With an operating system, it would be possible to direct such management. However, this would involve a waste of time of due to recording lengthy names implemented by a hierarchical file system and disk storage areas required for such names.

If there were a general, fast facility to obtain a file name from a file descriptor, it could easily be applied to a process of displaying the status of an operating task or a process of knowing the name of an open file in the checkpoint and restart processing.

The problems with the checkpoint and restart processing will be described next.

As described above, the treatment of a file at the time of checkpoint and restart is uniquely determined by the data attribute of the file and cannot be changed throughout job execution.

In particular, when a job is carried out for a long time and the capacity of a file needed at the start of job execution cannot be anticipated, the file capacity might exceed the available storage capacity. A facility has been desired which permits individual files to be treated differently during the execution of a job. Depending on the processing of a checkpoint program, even files of the same attribute might need to be treated differently. In such a case as well, however, they would be treated identically.

With the recent development of supercomputers, long-time jobs (e.g., several days) are often carried out. In this field, the file capacity of a checkpoint-to-be-taken file can increase contrary to anticipation prior to job execution. In such a case, the prior art method has to only increase the storage capacity at any rate because the file treatment in the checkpoint and restart processing is fixed. If no increase could be attained, it would result in failure in processing due to lack of capacity at the time a checkpoint is taken.

In the middle of execution of a job, the capacity of the corresponding file is checked. Even if the file has been specified at first to be saved, this specification is canceled when there arises the possibility that the file capacity may exceed the packaged storage capacity. If, in this case, the file can be saved on magnetic tape by some other means, the checkpoint and restart processing will have a wide range of applicability.

With respect to the prior art checkpoint/restart technique, the three following problems will be further described. The first problem is that it is difficult to change the checkpoint system and the restart system. In practice, it is almost impossible.

When it is desired to run a program on a system to take checkpoints and to perform restarting by another system, the i node numbers would generally vary between the checkpoint taking system and the restart system. In addition, the device numbers might also differ.

Thus, the prior art method which saves device numbers, i node numbers, and others as file management information cannot change the checkpoint taking system and the restart system. To change the systems, some other method is needed to change the i node numbers (and the device numbers) to conform to the changed systems.

For example, it may be considered to take checkpoints by a system and to begin a restart at a checkpoint by another high-performance system because more time is required than is expected. This cannot be performed easily.

The second problem is that, depending on the timing of checkpoints, a temporary file, i.e., a temporary file with no name, may not be saved and restored well. That is, a method which simply gives commands from the outside of a program may fail to perform the checkpoint taking process properly.

Here, the temporary file refers to a file that is used temporarily at the time of program execution and deleted from a file system after program execution. If a file that has become unnecessary is not removed in a timely manner, it will remain as "garbage" in the file system, reducing available disk space.

The temporary file with no name is made by calling an UNLINK function after it has been opened and declares itself to the operating system as a temporary file. An unlinked file cannot be accessed by a file name after that time (access by a file descriptor is permitted) and is automatically removed from the file system at the time of closing the file.

The prior art method examines whether a file is unlinked or not at the time a checkpoint is taken and, if it is unlinked, saves its contents together with file management information. On restart the file is opened by using an arbitrary name (since it is unlinked, any name is permitted). The file is restored using the saved information (the contents of the file and the management information) and is unlinked at the same time. Thus, a temporary file (nameless temporary file) can be restored. Note that, in the prior art as well, the contents of such a temporary file are restored by specifying a provisional name (the device number and the i node number are not used).

However, depending on the timing of checkpoints, the restart cannot be made well. For example, FIG. 4 shows a case where a checkpoint is taken at the point of (2) processing 1 Process 1 between (1) file open processing open and (3) unlink processing unlink, and a restart is made at the point of (5) processing Process 3 3 after the file processing terminates and the file is removed at the point of (4) close. In this case, however, such a restart cannot be made well.

That is, since the file is not unlinked when the checkpoint was taken, the checkpoint taking program cannot recognize it to be a temporary file and thus processes it as a general file (the prior art method saves information including the file access position). The file is later unlinked (declared as a temporary file), then removed from the file system during the file closing process. Subsequently the restart processing is carried out. Even if an attempt is made to restore the file access state to what it was at the point at which the checkpoint was taken using various kinds of management information, the file cannot be restored properly because the file itself is no longer present.

In this case, although the original file (temporary file to be processed) is not present, its device number and i node number may have been allocated to another file. If an entirely separate program is run before a restart is made to thereby create a file in the file system, an i node number will be allocated to that file. There is the possibility that this i node number may coincide with the i node number of the file removed previously.

That is, although the original file (file allocated by the (1) open processing) is no longer present, a separate file that coincides with that file in i node number and device number may be present.

As long as the restart program restores a file on the basis of a device number and an i node number, the i node number can be checked to decide whether the file has been removed or not. Some action can thus be taken. However, if the device number and the i node number have been allocated to a another file, the restart program has no key to knowing of this fact and thus cannot help assuming that processing was performed properly. Then, the restart program will resume a program to be run. As a result, an entirely different file will be read, failing to restore a file that is a candidate for restoration.

The checkpoint and restart at such timing will result in another problem that even a nameless file cannot be processed properly unless it is restored under the same name.

That is, since a file name (path name) is specified in the unlink processing after the open processing, the unlink at the time of reexecution will fail unless the same name as that at the time of opening is specified.

Note that a method by which a checkpoint is taken at any point, and processing is interrupted at that point, and later (the next day) a restart is made at the checkpoint, could circumvent such a problem, but it is inadequate for abnormal situations.

With the prior art method, the use of a temporary file with a name could circumvent the above-described problem for the time being, but this would result in a new problem. Here, all temporary files created under a directory on the basis of system operating conventions are considered as temporary files with names. That is, a system operator removes all temporary files with names at system startup or at a proper time so that unnecessary files will not remain on a disk.

Thus, the above-described problem could be circumvented by removing temporary files with names at the completion of the execution of the checkpoint and restart the processing program without removing them during the execution of that program. However, temporary files with names that other users use as well as temporary files with names that the checkpoint processing program uses would remain unremoved in the file system for that time, resulting in being pressed for disk capacity. If such a situation occurred, other users would be required to remove their temporary files with names.

The third problem is that, of the checkpoint and restart processing programs, particularly the restart processing program must be implemented with the kernel of the operating system, and enlarging the scale of the operating system results in an increase in the amount of memory required and a decrease in reliability.

With the prior art restart processing program based on physical management information for files, it is required to restore various control tables within the operating system which are associated with files that the operating system manages. The control tables that the operating system manages must be restored by the kernel of the operating system. Thus, the restart processing program run involves addition of facilities to the kernel of the operating system or modification of the kernel, which results in an increase in the scale of the kernel of the operating system.

Bugs of the kernel of the operating system may result in the system going down. Thus, an increase in the scale of the operating system will result in a decrease in the system reliability. In addition, the kernel of the operating system needs to reside permanently in a memory, which undesiably increases the amount of memory required.

SUMMARY OF THE INVENTION

It is an object of the present invention to enable the file name to be detected from a task even after a file has been opened.

It is another object of the present invention to permit file save at the point at which a checkpoint is taken and file restoration at restart time to be performed without any difficulty.

It is a further object of the present invention to reduce the scale of the kernel of an operating system.

In a preferred embodiment of the present invention for a file detecting method for use with an operating system for managing a file system having a hierarchical structure leading from a root node through intermediate nodes to files serving as final nodes, an intermediate node immediately before a file is stored at the time of opening the file, the intermediate node corresponding to the file being opened is detected on the basis of stored information as requested by a task, and the detected intermediated node is presented to the task.

With this file name detecting method, information specifying a directory (intermediate node), immediately before a file, is stored within the operating system to correspond with a file descriptor allocated to the file. Thus, the task simply specifies the file descriptor to identify the directory immediately before the file and can obtain the file name from the stored information in the directory.

In a preferred embodiment of the present invention for a checkpoint and restart method for use with a computer system having a hierarchically structured file system, the operating system is requested to detect the name of a file being opened by a checkpoint-to-be-taken task when requested by a user to take a checkpoint, the name of the file being opened is obtained from stored information in that intermediate node immediately before the file which is presented by the operating system, and a file save mode at the checkpoint and a file restore mode at restart time are specified on the basis of the name of the file.

The checkpoint and restart method of the present invention permits the name of a file being opened to be obtained at the checkpoint and information on the complete path name and the access state of the file to be stored as file management information, permitting the file to be restored using the file name without the use of the file device and i node numbers. For this reason, the restart processing can be performed by a different system from the checkpoint taking system.

Moreover, the checkpoint and restart method of the present invention can specify whether or not the contents of a file being used are to be saved at the checkpoint, whether or not the file is to be restored by the same name, and so on. Thus, even if the file is unlinked after the checkpoint has been taken, the file can be restored by the same name.

Furthermore, the checkpoint and restart method of the present invention eliminates the need for restoring file management information managed by the operating system on restart, thus permitting a restarting program to be implemented by an application program outside the operating system. Therefore, the scale of the kernel of the operating system application program can be reduced and the reliability of the operating system can be increased.

BRIEF DESCRIPTION OF THE DRAWINGS

One skilled in the art can easily understand additional features and objects of this invention from the description of the preferred embodiments and some of the attached drawings. In the drawings:

FIG. 12 illustrates a program for obtaining the complete path name of a file;

FIGS. 20 is a first diagram for use in explanation of a task activation method in UNIX;

FIG. 22 is a third diagram for use in explanation of a task activation method in UNIX;

DETAILED DESCRIPTION OF THE PREFERRED EMBODIMENTS

Figure 5:
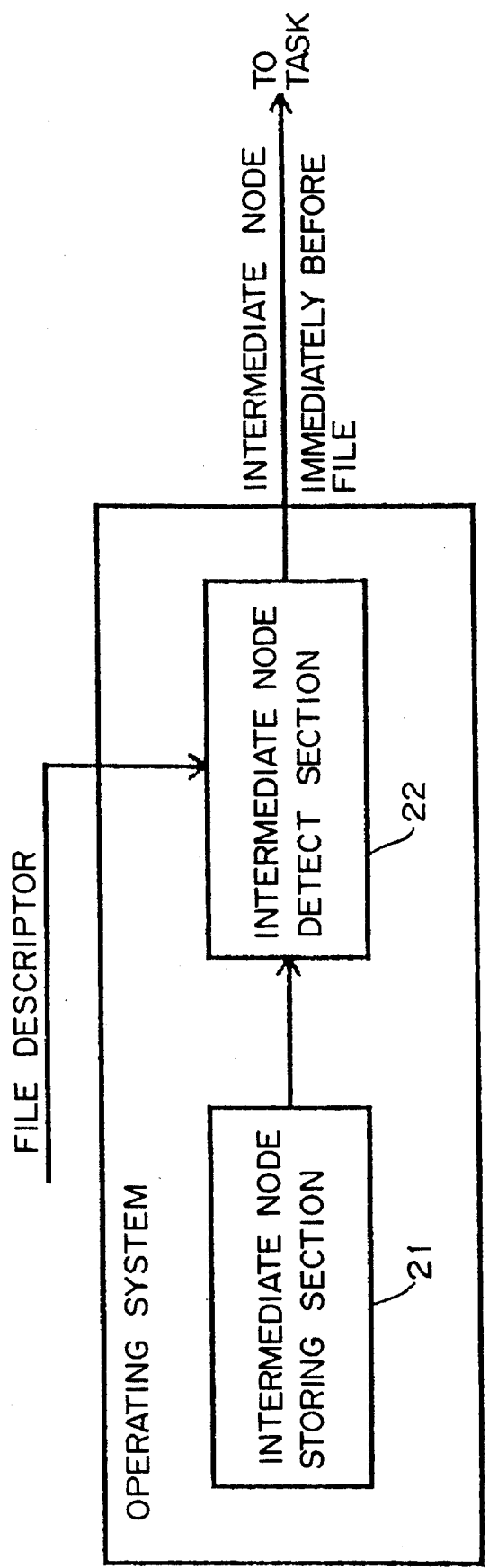
FIG. 5 is a diagram illustrating the basic arrangement of the present invention.

FIG. 5 shows the basic arrangement of the present invention. The figure shows major components of an operating system which has a file system with a hierarchical structure leading from a root node through intermediate nodes, e.g., directories, to files serving as final nodes, and permits a task, e.g., an application program, to use that file by specifying a file descriptor allocated to that file at the time of file open processing performed prior to the use of that file. The system operates on the basis of a file name detection method to obtain the name of the open file.

In FIG. 5, an intermediate node storage section 21 stores an intermediate node (directory) antecedent to a file, at the time of opening the file. An intermediate node detecting section 22 detects, when a file descriptor is specified, the intermediate node corresponding to the file descriptor in the intermediate node storage section 21 and informs a task of that node. Thus, the task using the file can read from the file system the stored contents of the intermediate node antecedent to the file to obtain the name of that file.

Figure 2:
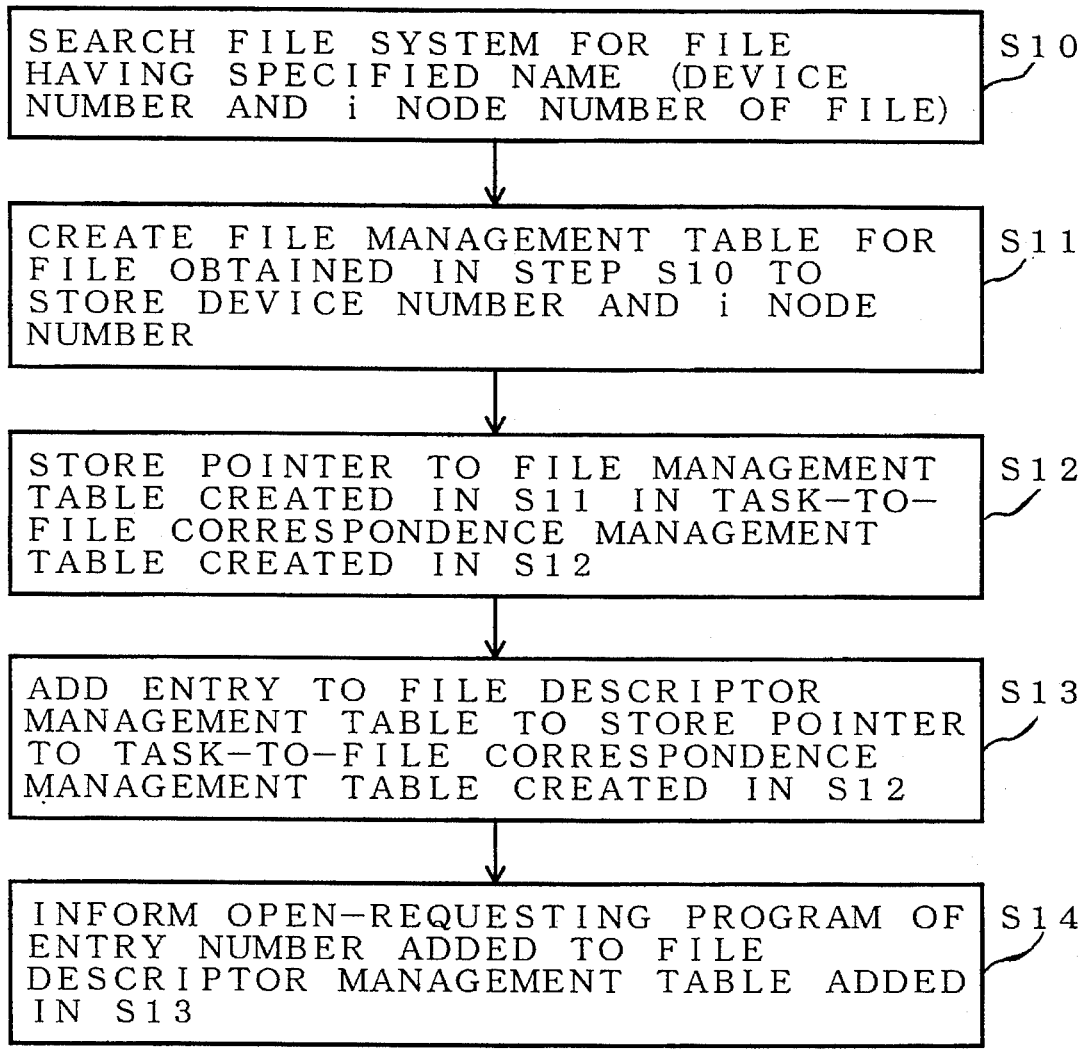
FIG. 2 shows an example of file open processing.
Figure 3:
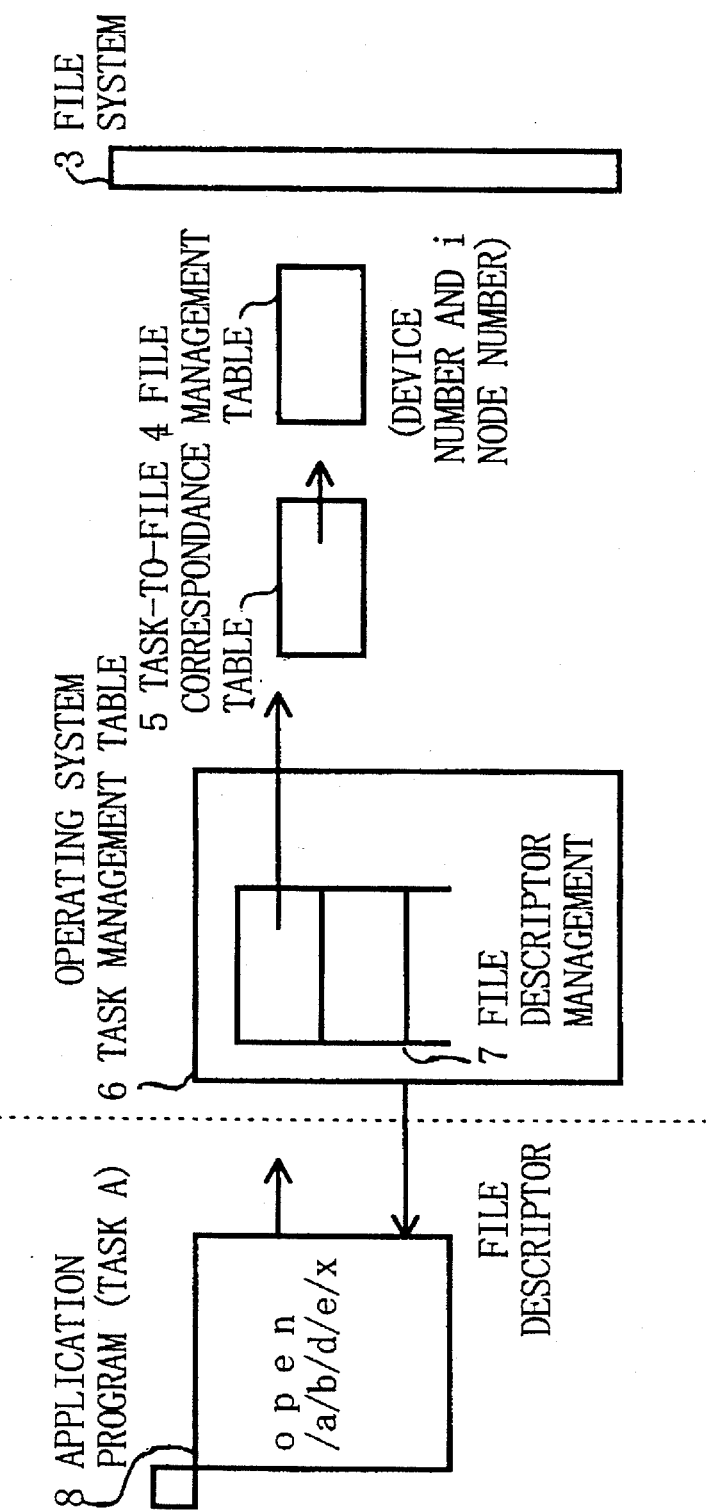
FIG. 3 shows management tables created when a file is opened.
Figure 4:
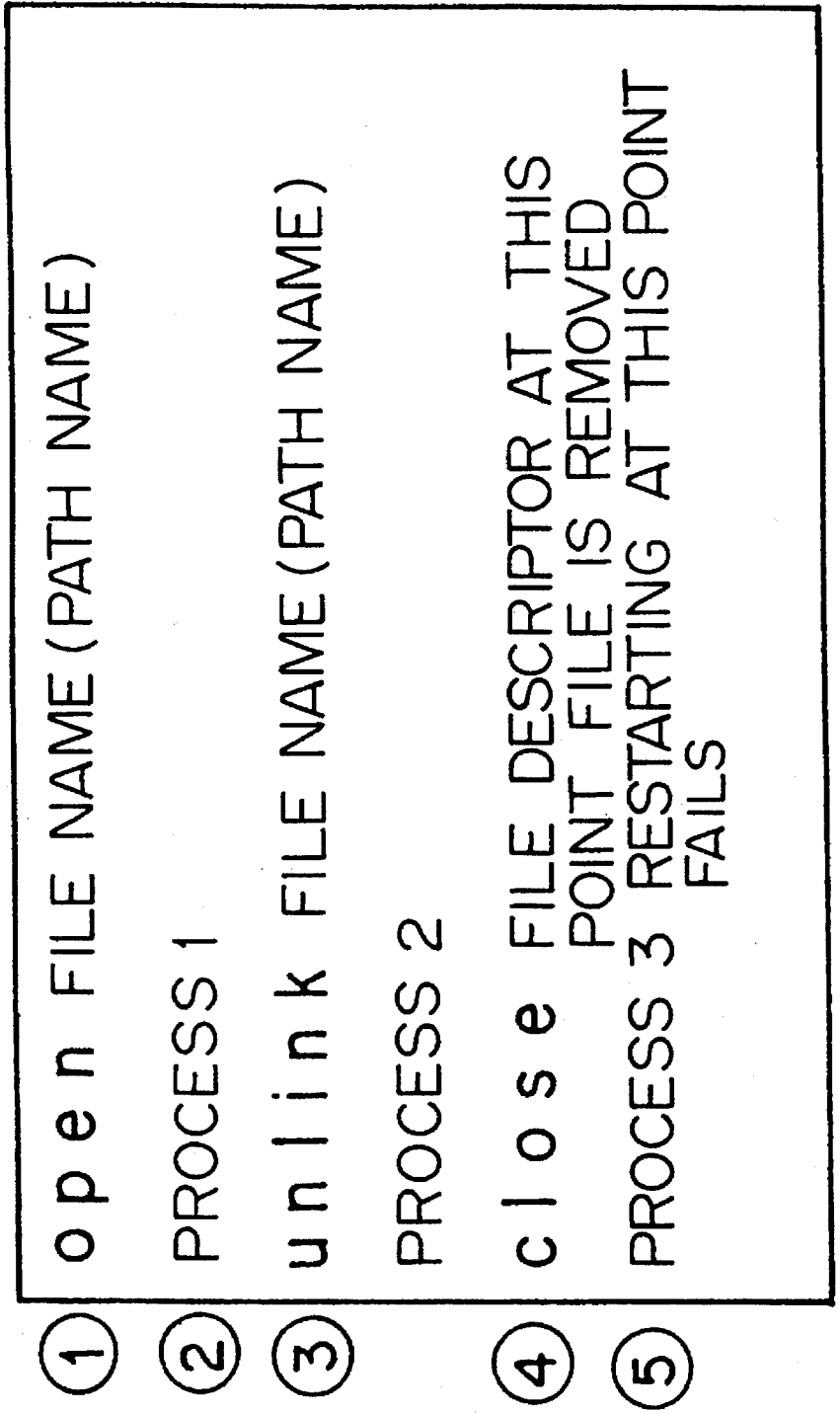
FIG. 4 is a diagram for use in explaining problems associated with checkpoint and restart processing.

As described in connection with FIG. 2, in the prior art file open processing, a file descriptor is presented to an application program, and after that access is permitted to the open file by using that file descriptor. In contrast, according to the present invention, a file management table for a directory (hereinafter referred to as a directory-oriented file management table) is created, which stores device and i node numbers of the intermediate node (for example, directory) antecedent to a file opened, in the file open processing.

When the name of a file becomes necessary after it has been opened, the intermediate node detecting section 22 in the operating system detects a directory-oriented file management table corresponding to a specified file descriptor and creates a management table (for example, a task-to-file correspondence management table). The management table pointer to the directory-oriented file management table. Further, a new entry of the pointer to the task-to-file correspondence management table is made to a file description management table, and its entry number is presented to the task as the file descriptor for the directory.

As a result, the task using the file can use the file descriptor for that directory to read the stored contents of the directory from the file system and obtain the name of the file under the directory, i.e., the file now in use.

That is, the present invention is configured to establish a correspondence between a file descriptor and an i node number, acquire a directory to which a file belongs, and retrieve the file name in the directory using the i node number, thereby obtaining the file name.

In addition, the operating system may be provided with a file descriptor information copying section which copies information containing the file descriptor of a file that some other task is using, thereby permitting the name of the file used by the other task to be obtained.

Moreover, in the present invention, in the checkpoint and restart processing, a file saving mode at the time of checkpoint and a file restoration or reopen mode at restart time can be specified individually for each of the files that have been opened by an application program at a checkpoint on the basis of its name. This is because the present invention enables the name of each of the files opened by an application program to be detected.

As described above, according to the present invention, the names of open files can be obtained from file descriptors. In the event of an error, therefore, file names can be visually displayed at the time a checkpoint is taken.

Figure 6:
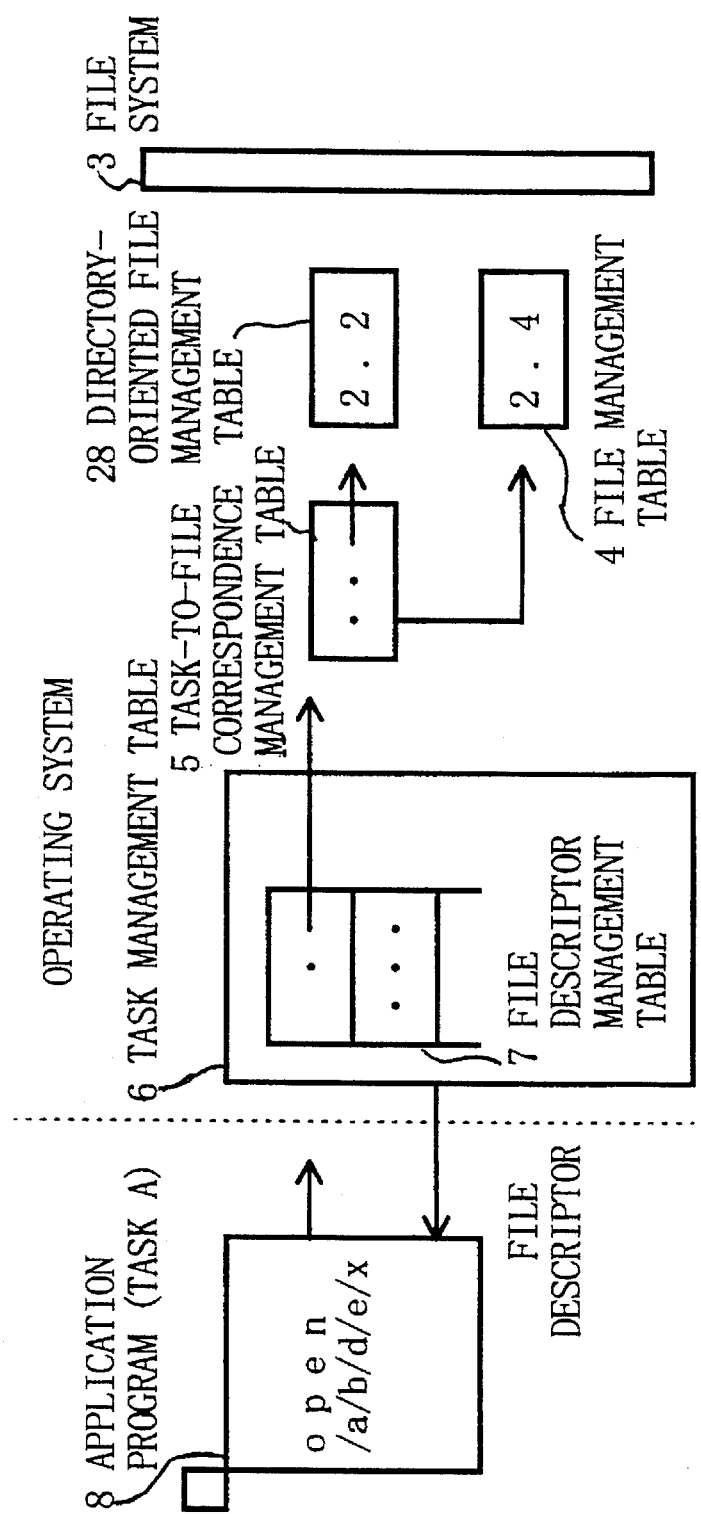
FIG. 6 is a diagram illustrating management tables created when a file is opened.
Figure 7:
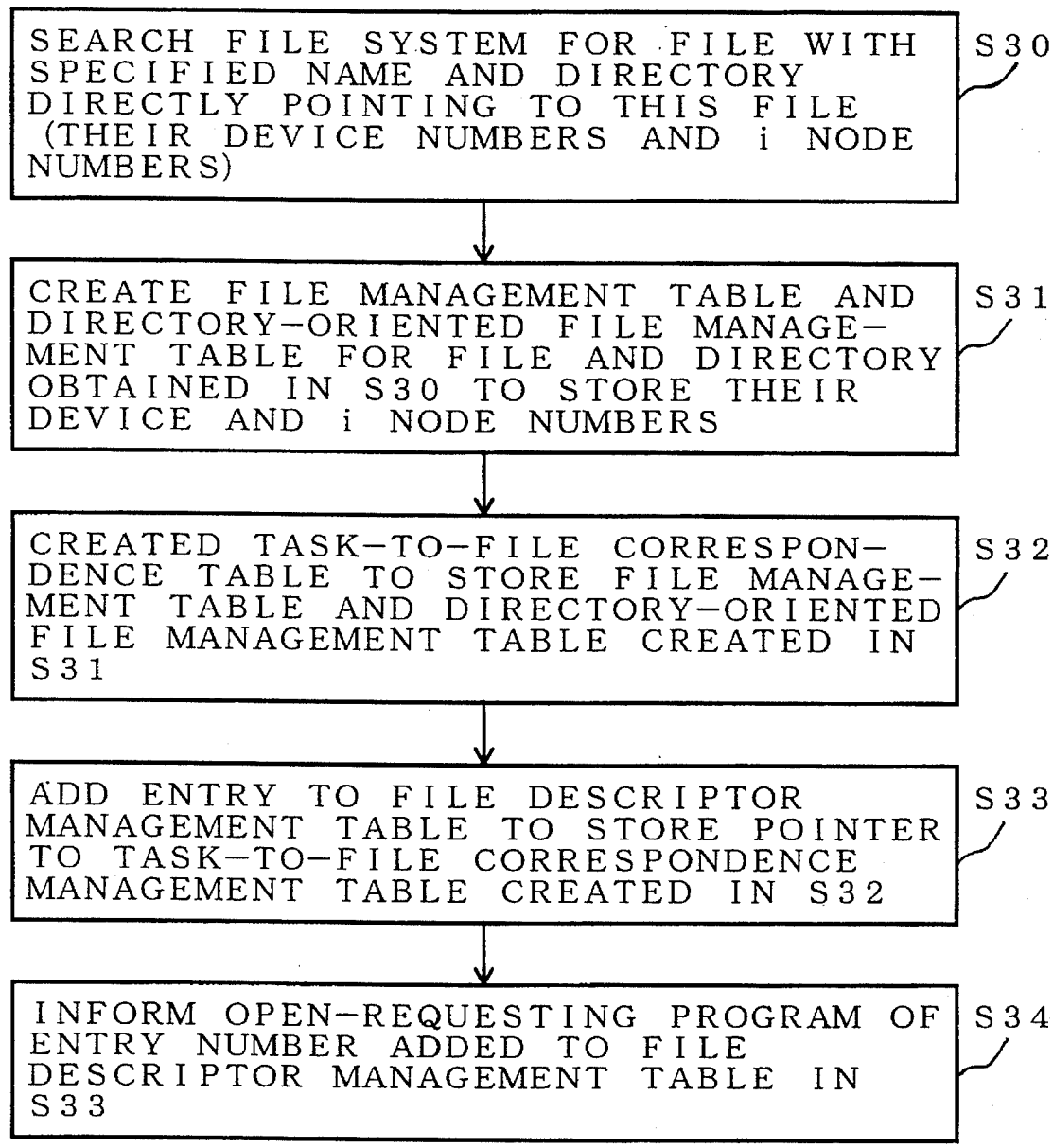
FIG. 7 is a diagram illustrating file open processing according to an embodiment of the present invention.

Next, FIGS. 6 and 7 illustrate file open processing according to an embodiment of the present invention.

FIG. 6 shows management tables created within the operating system when a file is opened. As shown, in the present embodiment, a directory-oriented file management table 28 is newly added when a file is opened. Pointers to file management table 4 and directory-oriented file management table 28 are stored in task-to-file correspondence management table 5. Directory-oriented file management table 28 are stores the device number 2 and the i node number 2 of the directory antecedent to file x in the file system of FIG. 1, i.e., directory e.

In the file open processing, a search is made of file system 3 for a file having a specified name and a directory directly pointing to that file in step S30 of FIG. 7. Thereby, their own device and i node numbers are obtained. In step S31, file management table 4 and directory-oriented file management table 28 are respectively created for the file and the directory, and the corresponding device and i node numbers are then stored in each of these tables.

In subsequent step S32, task-to-file correspondence management table 5 is created to store pointers to file management table 4 and directory-oriented file management table 28. Steps 33 and 34 respectively correspond to steps S13 and S14 of FIG. 2. In step S34, the entry number of file descriptor management table 7 is presented to application program (task A) 8 as a file descriptor, thereby terminating the file open processing.

FIG. 7 shows an example of the file open processing in an operating system in which the hierarchy of the file system is represented by complete path names as a form of file names, directories are treated as a type of file, a file descriptor is given for each task as an entry number of file descriptor management table 7, and device and i node numbers, serving as a file retrieval key within a directory, are obtained by a file descriptor. A typical example of such an operating system is UNIX.

Figure 8:
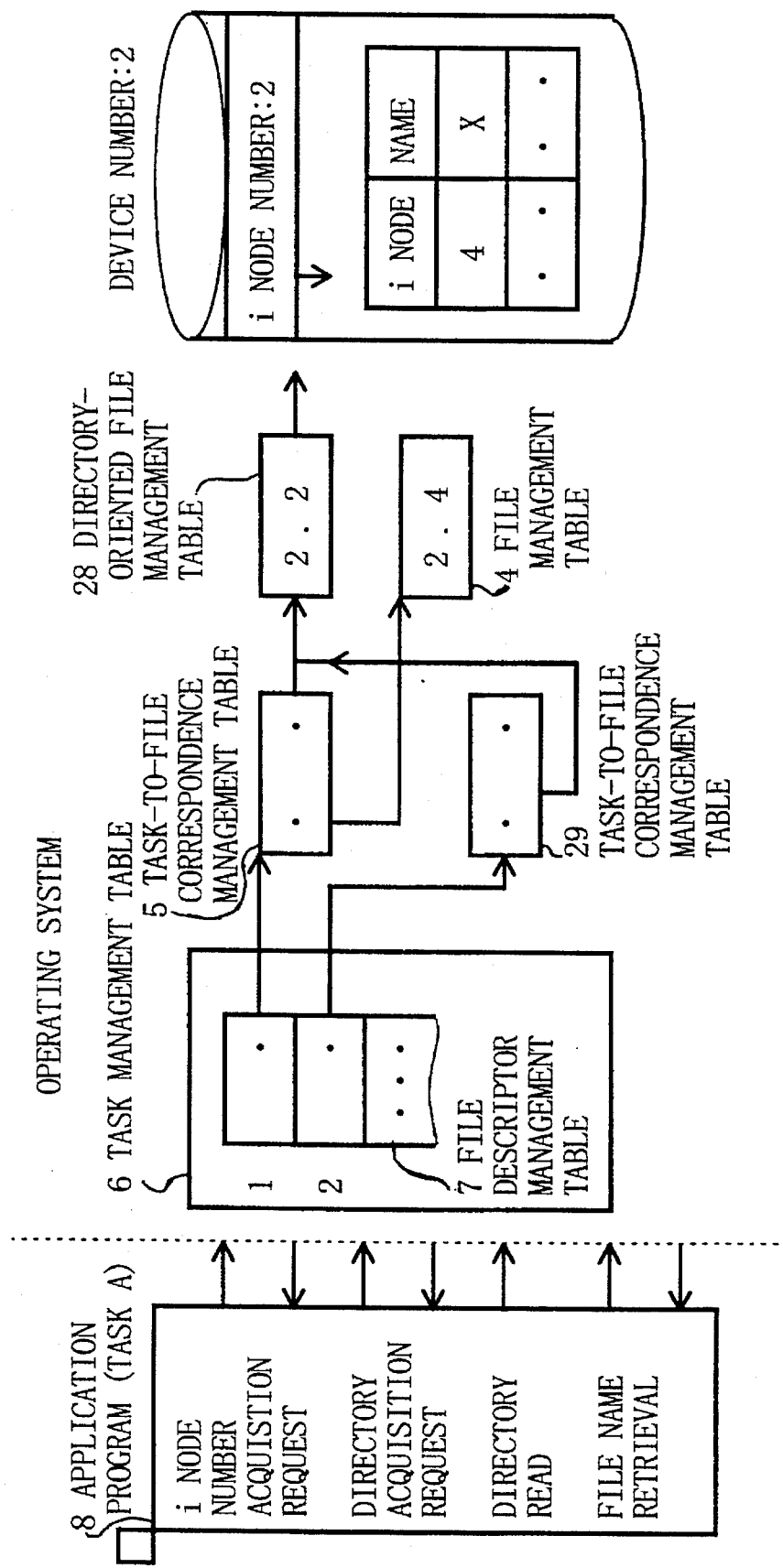
FIG. 8 shows management tables created at the time of detecting the name of a file.
Figure 9:
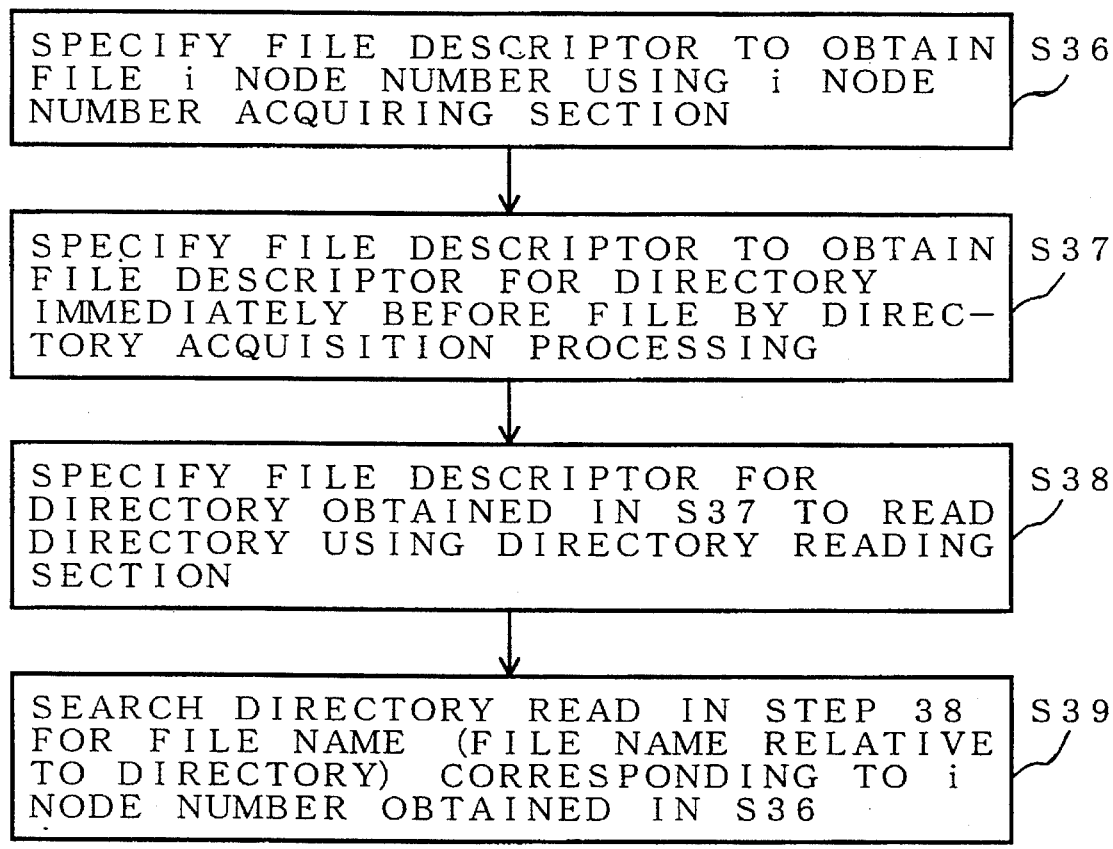
FIG. 9 illustrates file name detection processing.

The process of obtaining the name of an open file by application program 8 will now be described with reference to FIGS. 8 and 9. FIG. 8 shows management tables created within the operating system at the time of detection of file names. FIG. 9 illustrates the file name detection procedure.

Upon receipt of a request to acquire a directory from the application program, the operating system creates a new task-to-file correspondence management table 29 (see FIG. 8), which directly points to directory-oriented file management table 28, and adds a new entry storing a pointer to that table 29 in file descriptor management table 7.

When application program 8 needs to know the name of an open file which is now being processed, it can obtain the name according to steps S36 through S39 of FIG. 9. First, in step S36, a file descriptor is specified to obtain the file i node number using i node number acquiring means, which is an existing technique. For example, in UNIX, the use of an FSTAT function permits the i node number corresponding to a specified file descriptor to be obtained.

In subsequent step S37, a file descriptor is specified to obtain a file descriptor for the directory antecedent to the file by using directory acquisition processing. The detail of the directory acquisition processing will be described with reference to FIG. 11.

In subsequent step S38, the file descriptor for the directory thus obtained is specified to read the contents of the directory using directory reading means. This directory reading means is also an existing technique. In UNIX, the use of a READDIR function permits the contents of a directory corresponding to a specified file descriptor to be read into main storage. Finally, in step S39, a search is made of the contents of the directory thus read for the name (this is a name relative to the immediately preceding directory, not a complete path name) of the file corresponding to the i node number obtained in step S36, thereby terminating the processing.

Figure 1:
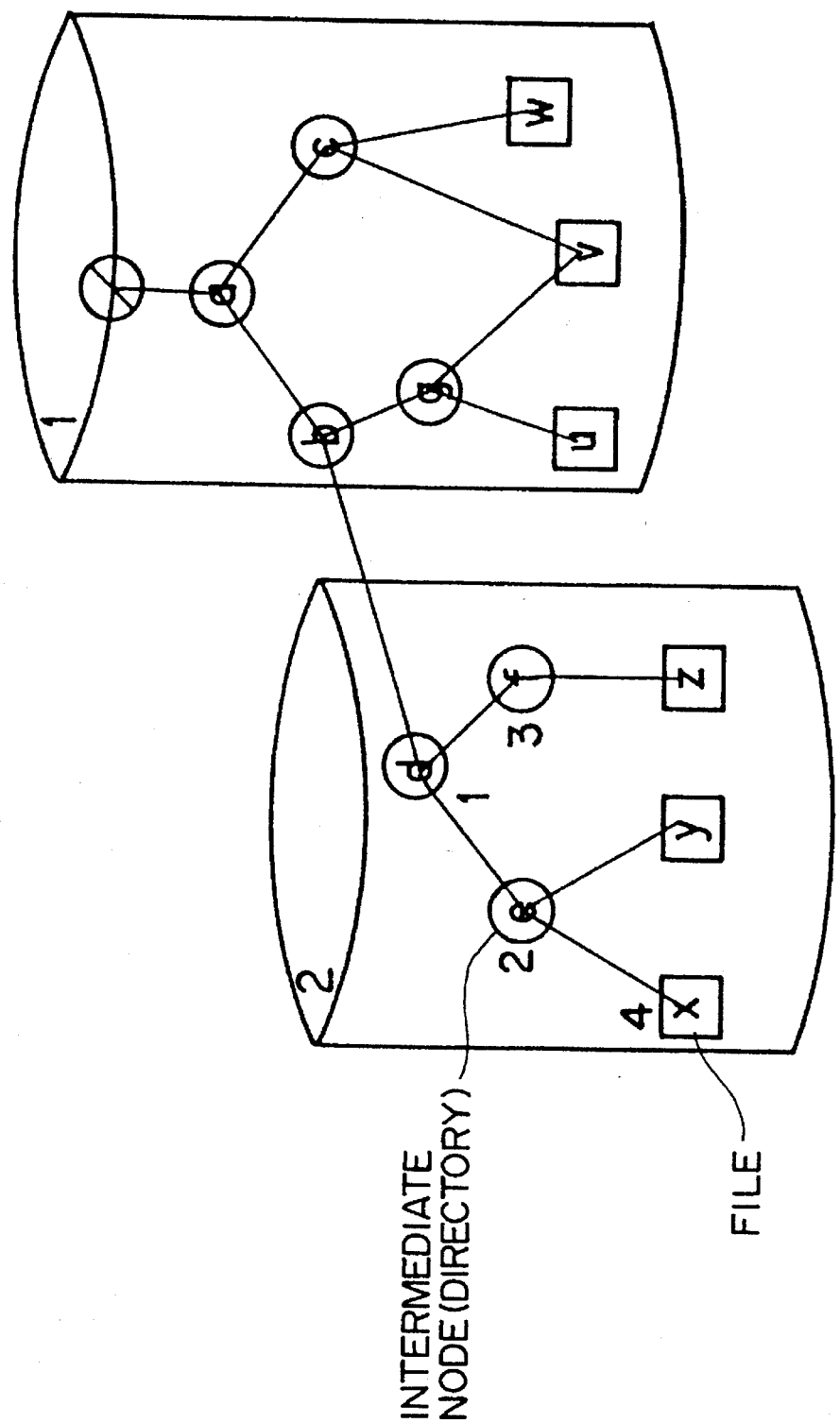
FIG. 1 shows an example of a hierarchically structured file system.

In step S39, a file name relative to the immediately preceding directory is obtained on the basis of an i node number having a one-to-one correspondence with a corresponding file. Thus, even in the case where there is another file y under the directory e antecedent to the file x as shown in FIG. 1, the i node number obtained in step S36 corresponds to the file x, thus permitting the file name x to be obtained. In general, a plurality of files are placed under a directory antecedent to some file as are the files x and y.

Figure 10:
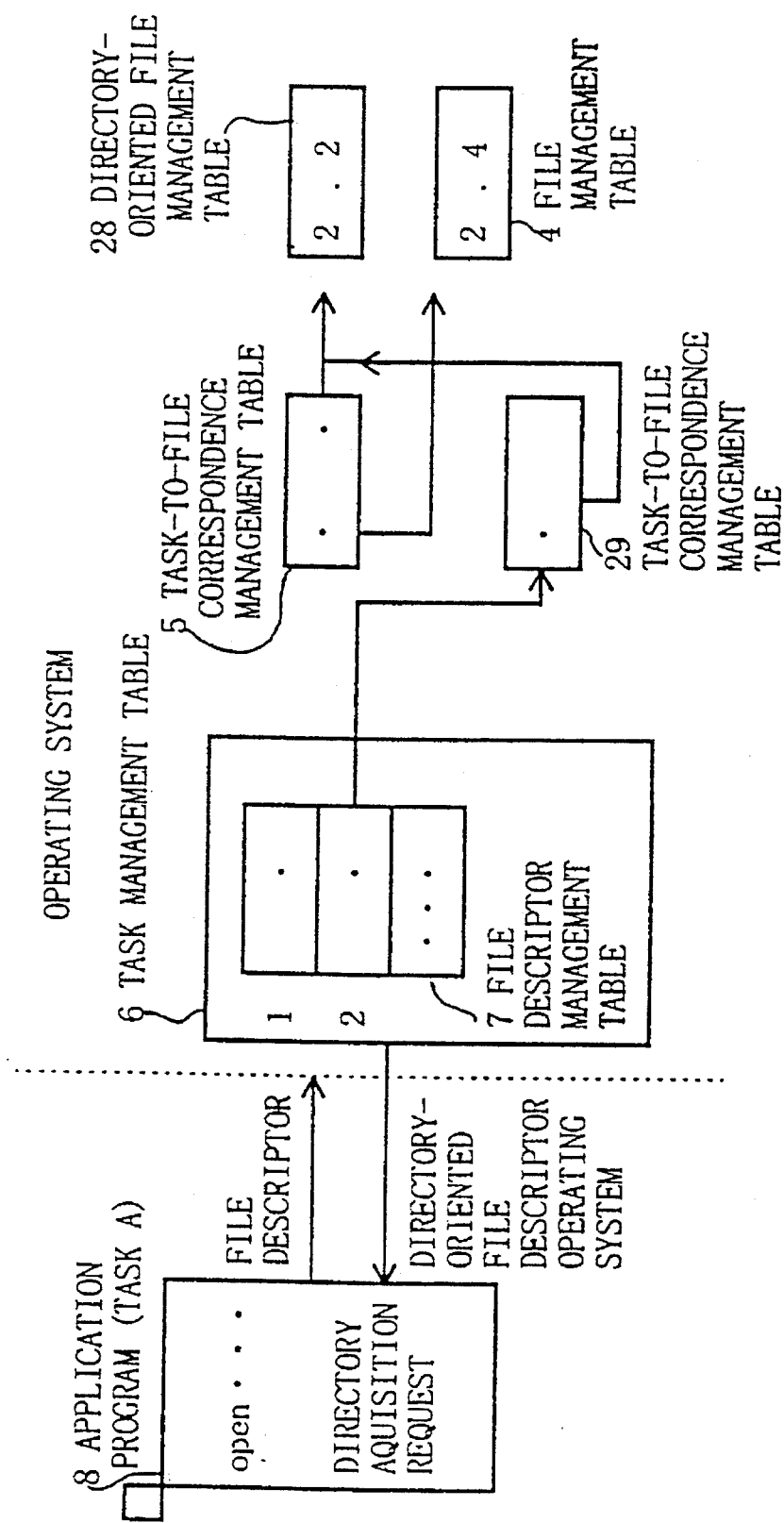
FIG. 10 is a diagram illustrating management tables created at directory acquisition time.

Next, the directory acquisition procedure in step S37 of FIG. 9 will be described in detail with reference to FIGS. 10 and 11. FIG. 10 shows management tables created within the operating system when a directory acquisition request is made. FIG. 1 illustrates the directory acquisition procedure.

Figure 11:
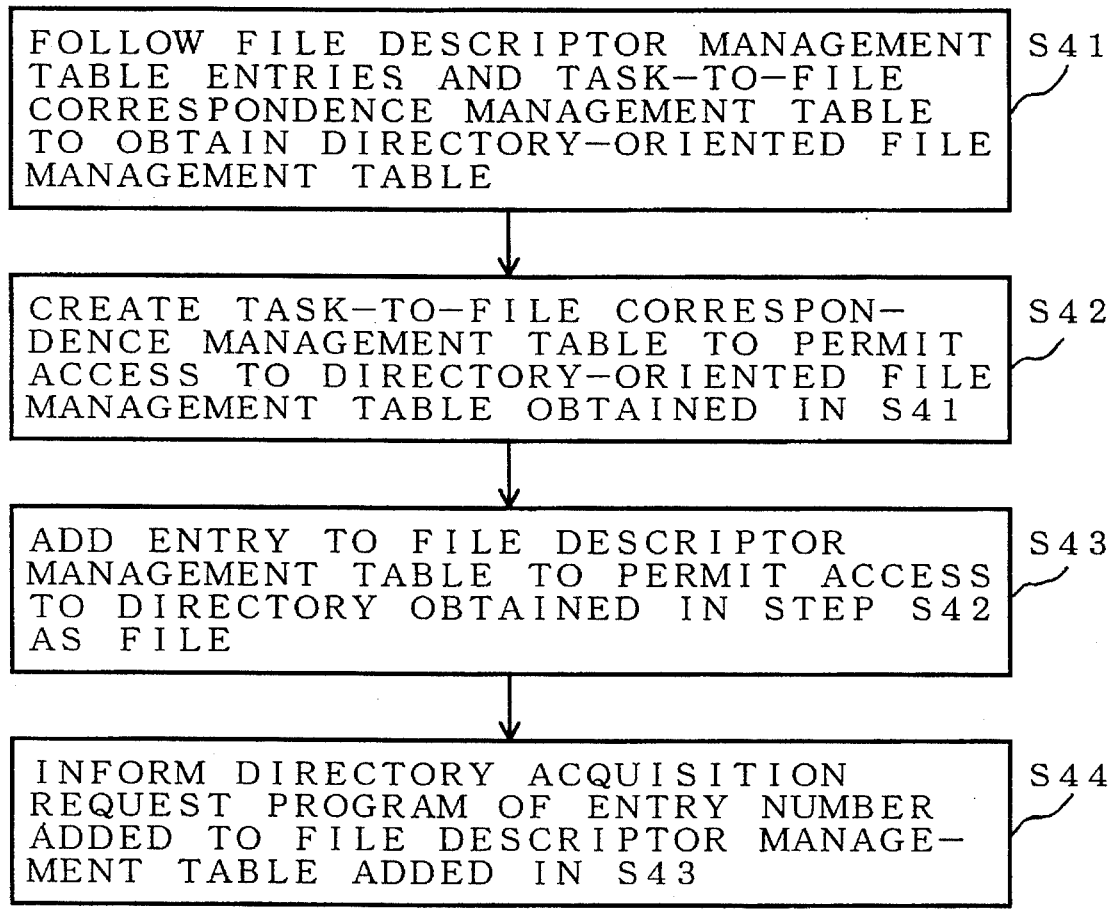
FIG. 11 illustrates directory acquisition processing.

First, in step S41 of FIG. 11, an entry of file descriptor management table 7 for a file descriptor specified by application program 8 and task-to-file correspondence management table 5 are traced to obtain directory-oriented file management table 28 created in step S31 of the file open procedure of FIG. 7. In FIG. 10, an arrow indicating a file descriptor specified by application program 8 to the operating system corresponds to that directory acquisition request.

In step S42 of FIG. 11, a task-to-file management table 29 is newly created so that direct access to directory-oriented file management table 28 can be made. In step S43, an entry is added to file descriptor management table 7 within task management table 6, so that a pointer to newly created task-to-file correspondence table 29 is stored in it. In step S44, the entry number added to file descriptor management table 7 is presented as a file descriptor for the directory to directory acquisition requesting application program 8, thereby terminating the processing.

By the procedures of FIGS. 9 and 11, the directory to which the file belongs, i.e., the directory antecedent to the file shown in FIG. 1, is obtained. When the file name relative to that directory, e.g., x as the name relative to directory e, is obtained, the complete path name for x within the hierarchical file system can be obtained.

FIG. 12 shows an example of a program for obtaining this complete path name. When a file descriptor for a directory is given, a function for moving the current directory to that directory, the FCHDIR function in UNIX, and a function, the GETCWD function in UNIX, for obtaining the name of the current directory can be combined to obtain the complete path name. That is, the current directory is moved temporarily to a directory to which a file descriptor that is now to be processed belongs, and then the name of the current directory is obtained by the current-directory name obtaining program. By combining the name of the directory thus obtained and the file name relative to that directory into a character string, the complete path name can be obtained. In general, if a directory is specified, a file system is also specified. Thus, the present embodiment eliminates the need for searching a plurality of file systems.

In the above, the present embodiment has been described for the case where some program obtains the names of files opened by it. In the present invention, however, it is also possible to obtain the names of files opened by any other program than that program.

Figure 13:
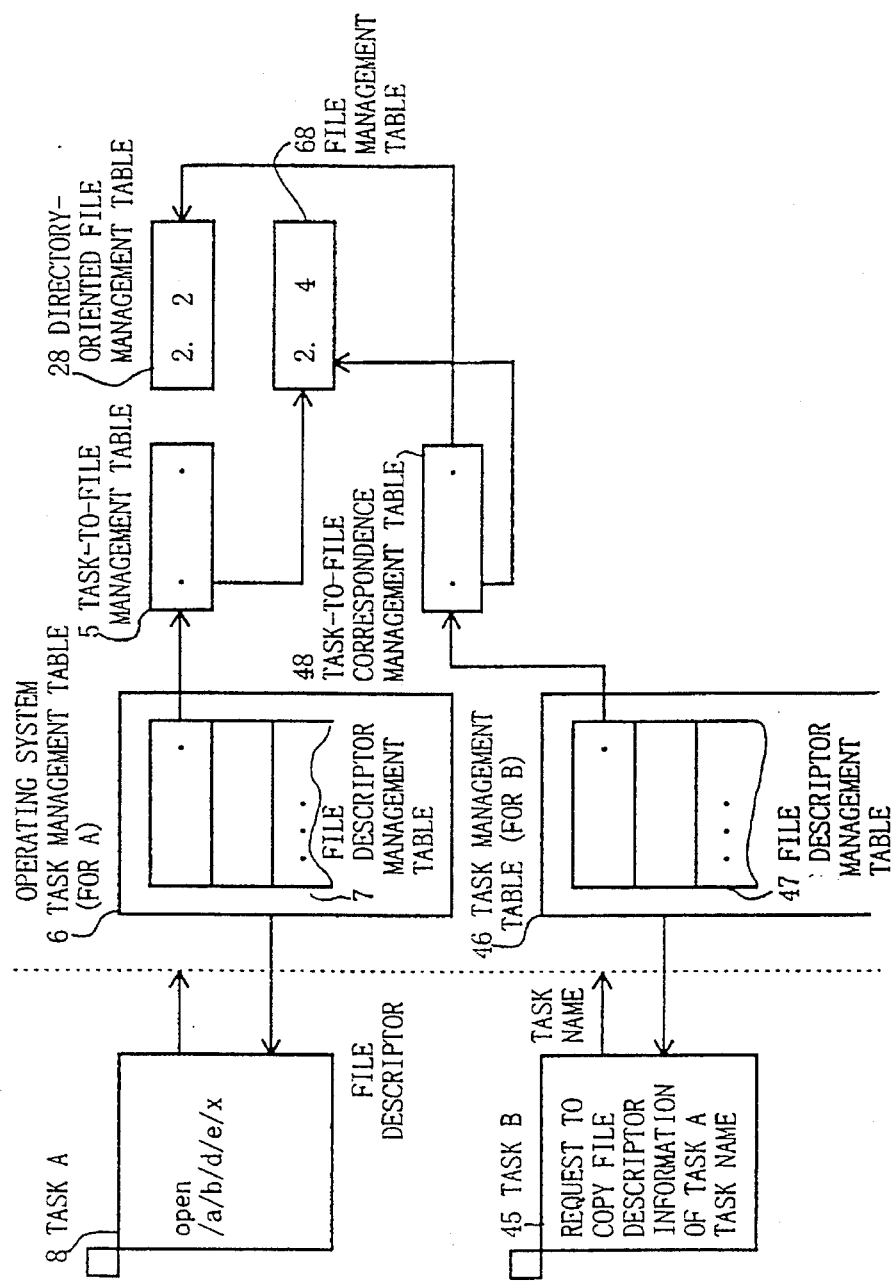
FIG. 13 is a diagram illustrating management tables created when file descriptor information is copied.
Figure 14:
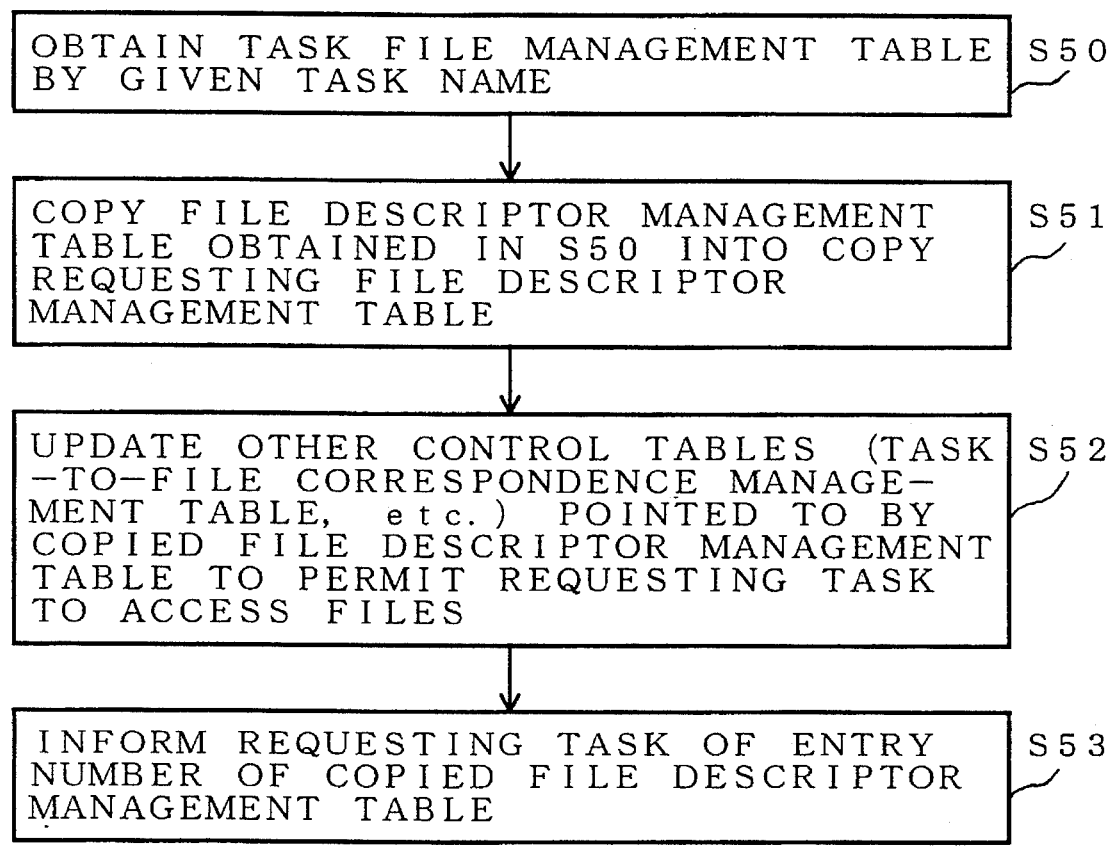
FIG. 14 illustrates file descriptor information copy processing.

FIGS. 13 and 14 illustrate processing for obtaining the names of files that have been opened by another such task. FIG. 13 illustrates management tables created within the operating system when file descriptor information is copied. FIG. 14 illustrates the file descriptor information copy procedure.

Hereinafter, a description will be made of the case where task B45 obtains the name of a file opened by task A8 different from task B45.

On the task A8 side, the open processing described in connection with FIG. 7 is performed, so that file management table 4, directory-oriented file management table 28, task-to-file correspondence management table 5 storing pointers to those tables 4 and 28, and that entry of file descriptor management table 7 which stores a pointer to table 5 have been created, and a file descriptor as an entry number of file descriptor management table 7 has been returned to task A.

When, in this state, task B45 causes a request to copy the file descriptor information of task A8, file descriptor management table 7 of task A is obtained in step S50 of FIG. 14 on the basis of the task name, here task A. In step S51, the contents of file descriptor management table 7 thus obtained are copied into task management table 46 on the requesting task B45 side as a file descriptor management table 47 (see FIG. 13). In step S52, a task-to-file management table 48 is newly created on the task B45 side as a control table pointed to by copied file descriptor management table 47, and pointers are set so as to permit access by table 48 to file management table 4 and directory-oriented file management table 48. In step S53, an entry number of copied file management table 47 is presented to the requesting task, here task B, as a file descriptor. Thereby, task B45 is subsequently permitted to make access to a file opened by task A8 by the use of that file descriptor.

An embodiment of the checkpoint and restart processing using a file name detected by the above-described file name detecting method will now be described.

As described above, the checkpoint and restart processing is processing which saves intermediate status in the middle of execution of a program for providing against the occurrence of abnormality and, in the event of abnormality, restarts the program from the point at which a checkpoint was taken. The use of the present invention allows a checkpoint requesting user to specify a mode of saving files at a checkpoint and a mode of restoring or reopening files at restart time on the basis of the names of individual files opened by a checkpoint-to-be-taken program, solving many problems described in connection with the prior art.

Figure 15:
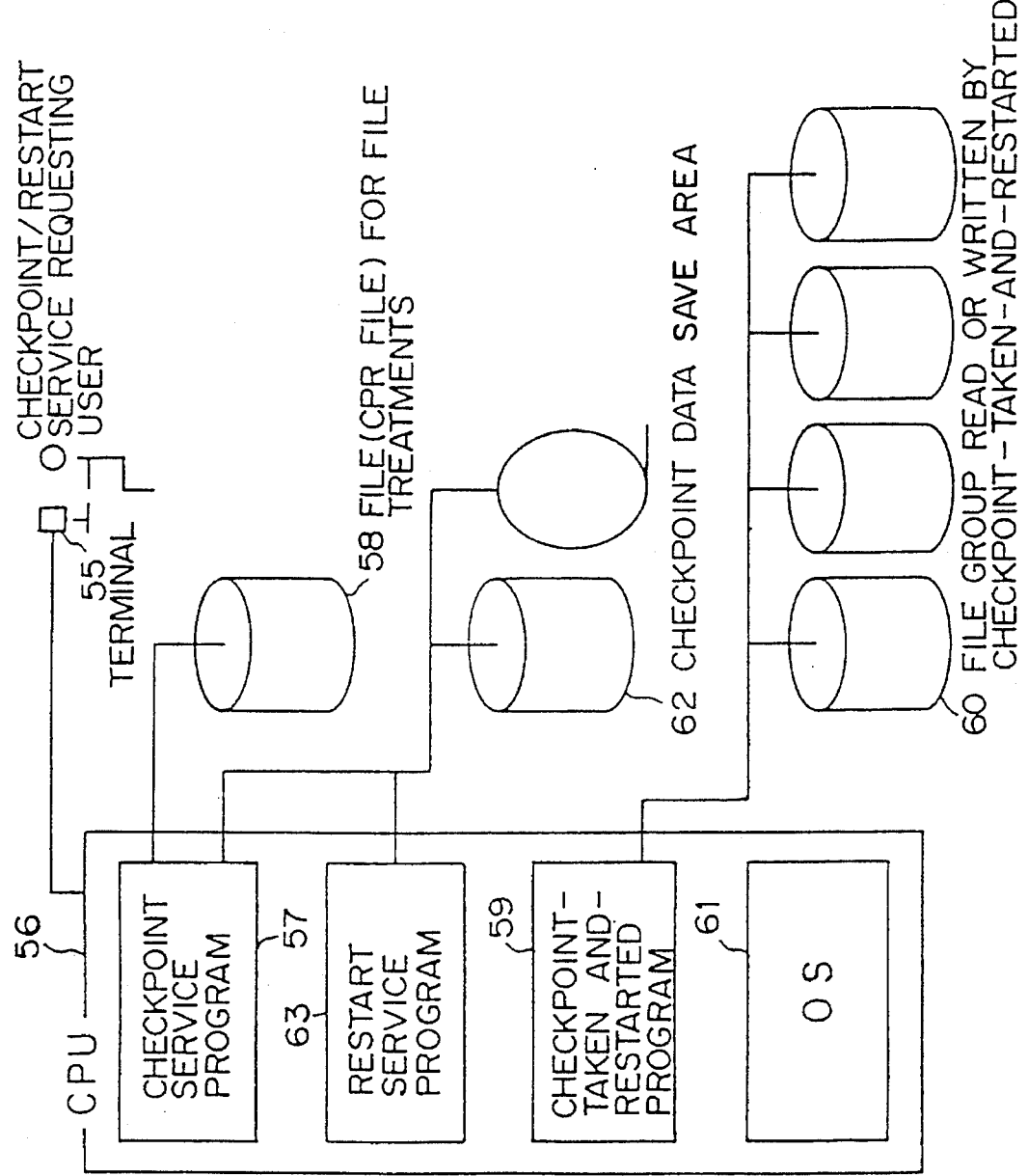
FIG. 15 is a diagram for use in explanation of the operating environment of a system for performing checkpoint and restart processing.

FIG. 15 shows a system configuration illustrating the operating environment of the checkpoint and restart processing. To request checkpoint and restart service, a user enters a command into a CPU 56 via a terminal 55. By this request, a checkpoint service program 57 within CPU 56 is started first, which, as required, refers to the contents of a file (CPR file) 58 that stores file treatments at checkpoint and restart time. A checkpoint-taken-and-restarted program 59 is opened to save data in a file group 60 which is currently being read/written in a checkpoint data save area 62 for later restart. The checkpoint and restart program 59 itself is also saved in checkpoint data save area 62. For restart, a restart service program 63 restores data saved in checkpoint data save area 62 in file group 60. At this point, checkpoint and restart program 59 itself is restored, thereby restarting processing.

Figure 16:
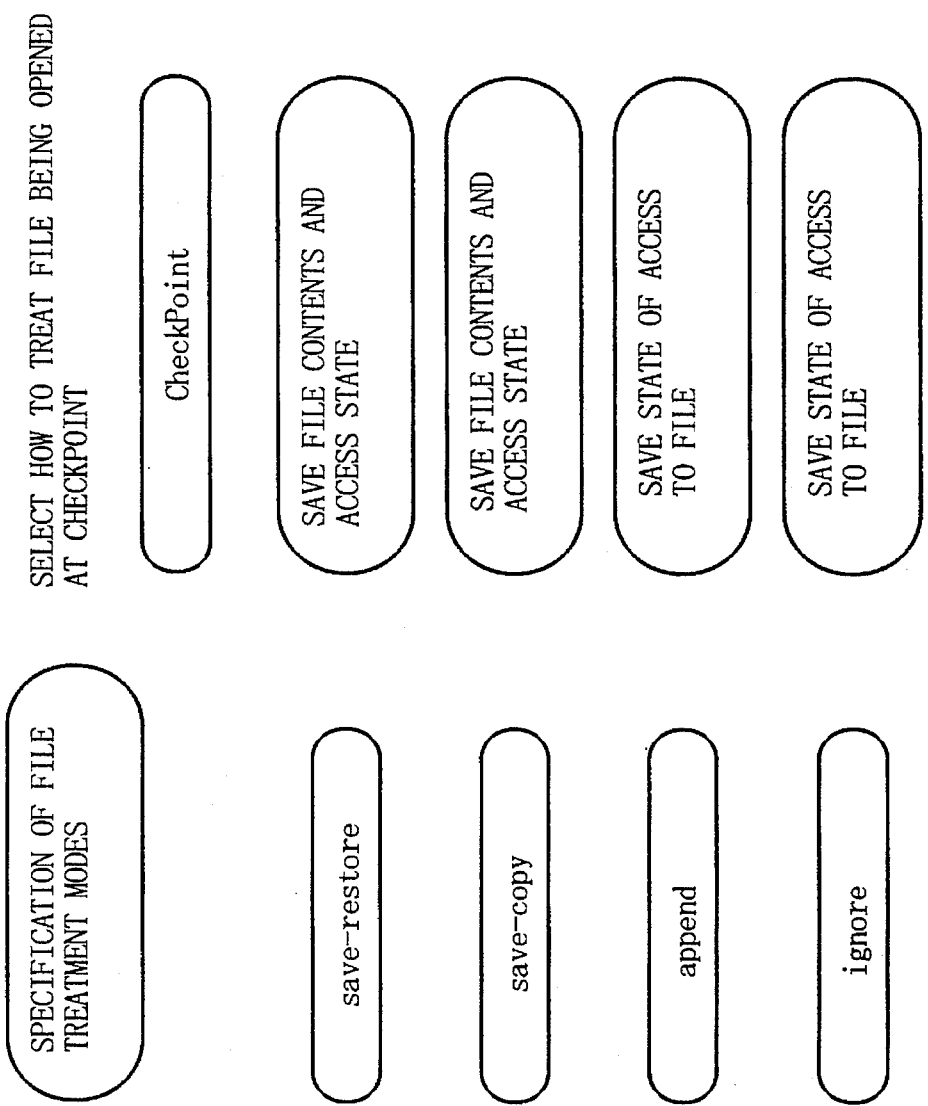
FIG. 16 is a diagram for use in explanation of file treatment specifying modes.

FIG. 16 illustrates a system for specifying how a file is to be treated in the checkpoint and restart processing. As described in connection with FIG. 15, a checkpoint and restart service requesting user first starts the checkpoint procedure by entering a CPR command via terminal 55. In this case, the user can specify a command parameter indicating how an open file is to be treated on the basis of its name. Parameters can be previously stored in a file called a CPR file as required to eliminate the need to specify a parameter at the time a command is entered. Thus, the user is allowed to specify how to treat a file in the checkpoint and restart procedure for each file. This can be performed at any point between the beginning of a job and the point at which a checkpoint is taken.

As shown in FIG. 16, the present embodiment has four modes for specifying how a file is to be treated in the checkpoint and restart processing. The first mode is called "save and restore", by which the contents of a file and the access status are saved at the point at which a checkpoint is taken and, on restart, the file is restored on the basis of its contents and the access status saved. In this case, as the file name at restoration time, the original name is used as it is.

The second mode is called "save and copy". According to this mode, although the contents of a file and the access status are saved at a checkpoint and, on restart, the file is restored using its contents and the access status, the file restored on restart is treated as a temporary file and its name may or may not match the original name.

The third mode is called "append". According to this mode, the contents of a file are not saved at a checkpoint and, on restart, it is reopened in the append mode. That is, the contents of a file are maintained as they are at restart time, and the access status of the file is also maintained as it is at restart time.

The fourth mode is called "ignore". According to this mode, at a checkpoint, the access status of a file (access position, etc.) is saved without saving its contents. On restart, the file is reopened in the access status saved at the checkpoint.

Figure 17:
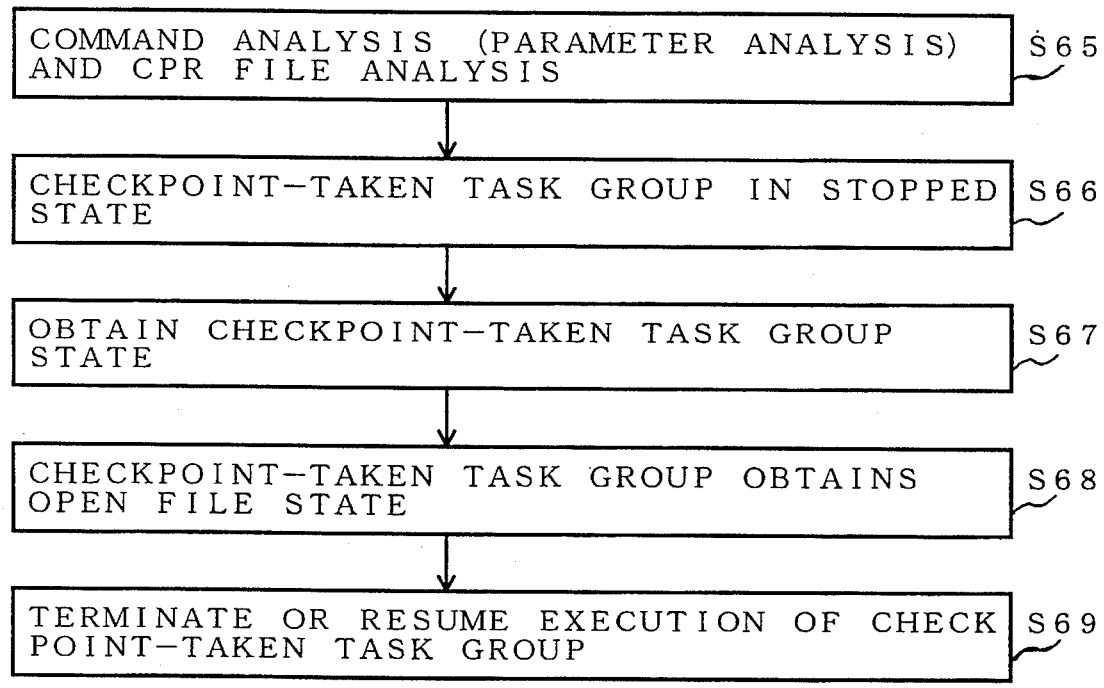
FIG. 17 illustrates checkpoint taking processing.

FIG. 17 illustrates the processing by a checkpoint taking task. The task acquires checkpoint data from a group of tasks for which checkpoints are to be taken on the basis of identified of the task group, file names, and information on save and restoration of files. Here, the task group refers to a program which is a candidate for checkpoint and restart processing. In general, such a program comprises one parent task and one or more child and grandchild tasks. The relationship between parent and child tasks and others will be described later with reference to FIGS. 20, 21, and 22.

A checkpoint service requesting user enters a checkpoint take command into the system via terminal 55 of FIG. 15 to activate the checkpoint taking task, which, when activated, performs processing in accordance with the following procedure.

The checkpoint taking task first conducts a command analysis (parameter analysis) and a CPR file analysis in step S65 of FIG. 17. The checkpoint take command includes specified identifiers of checkpoint-to-be-taken tasks for which checkpoints are to be taken. The checkpoint take command may specify how files being processed by the checkpoint-to-be-taken tasks are to be saved and restored. Depending on circumstances, information as to how to save and restore each file may be described previously in a file called a CPR file, in which case, its name can be specified by the command. In any case, information about the identified of the checkpoint-to-be-taken task group, the names of files, and how to save and restore them is obtained.

Figure 18:
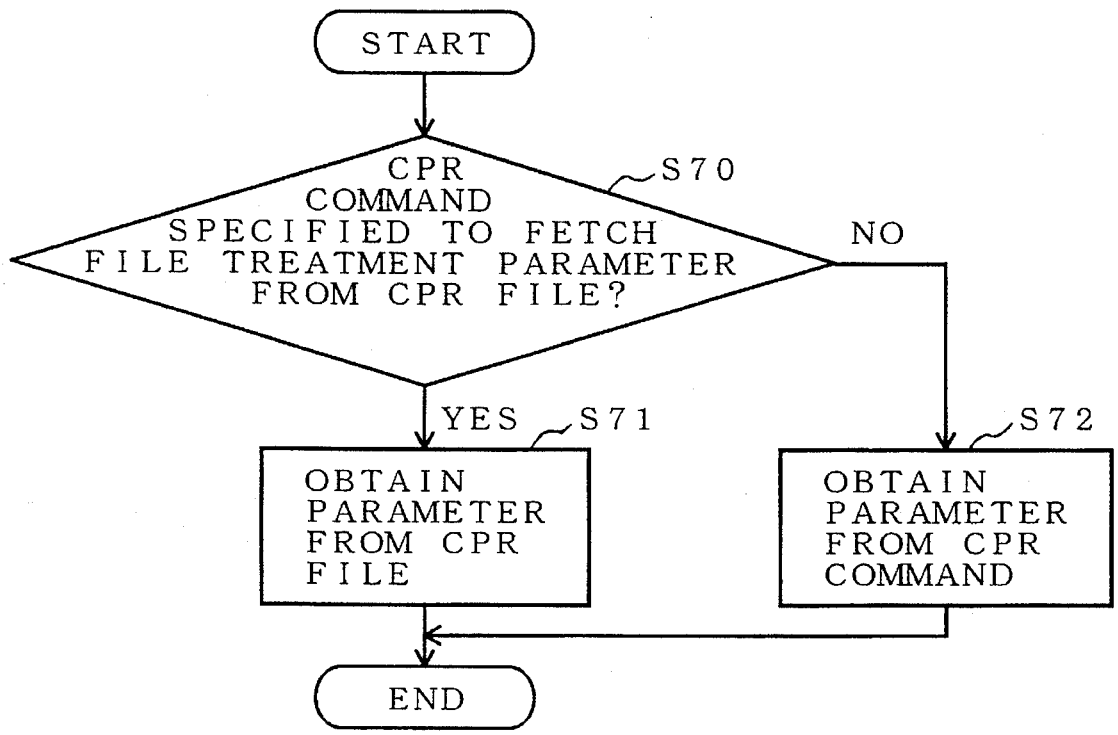
FIG. 18 illustrates command analysis and CPR file analysis in the checkpoint taking processing.

FIG. 18 is a detailed flowchart for the command analysis and the CPR file analysis. In step S70, a decision is made as to whether or not a CPR command specifies that a parameter regarding how to treat a file is to be fetched from the CPR file. If specified, that parameter is obtained from the CPR file in step S71; otherwise, that parameter is obtained from the CPR command in step S72.

On termination of the process of FIG. 18, the checkpoint taking task next performs step S66 of FIG. 17. In this step, the checkpoint-to-be-taken task group is placed in the stopped state. That is, all the tasks in that group enter the stopped state. If the group consists of a parent task and a child task, then the two tasks will be placed in the stopped state.

Subsequently, the checkpoint taking task performs step 67, by which the status of the checkpoint-to-be-taken task group is obtained. That is, a list of tasks in that group (a list of task identifiers) is obtained to obtain the status of each task. The status of a task refers to the contents of its virtual space (the contents of a program and data) and management information of the operating system (the position of instructions whose execution was suspended, the contents of registers, etc.). The information is saved in a file in checkpoint data save area 62 of FIG. 15.

In subsequent step S68 the checkpoint taking task obtains the status of files being opened by the checkpoint-to-be-taken task group. For this process use is made of the above-described method of detecting the file name from a file descriptor.

Figure 19:
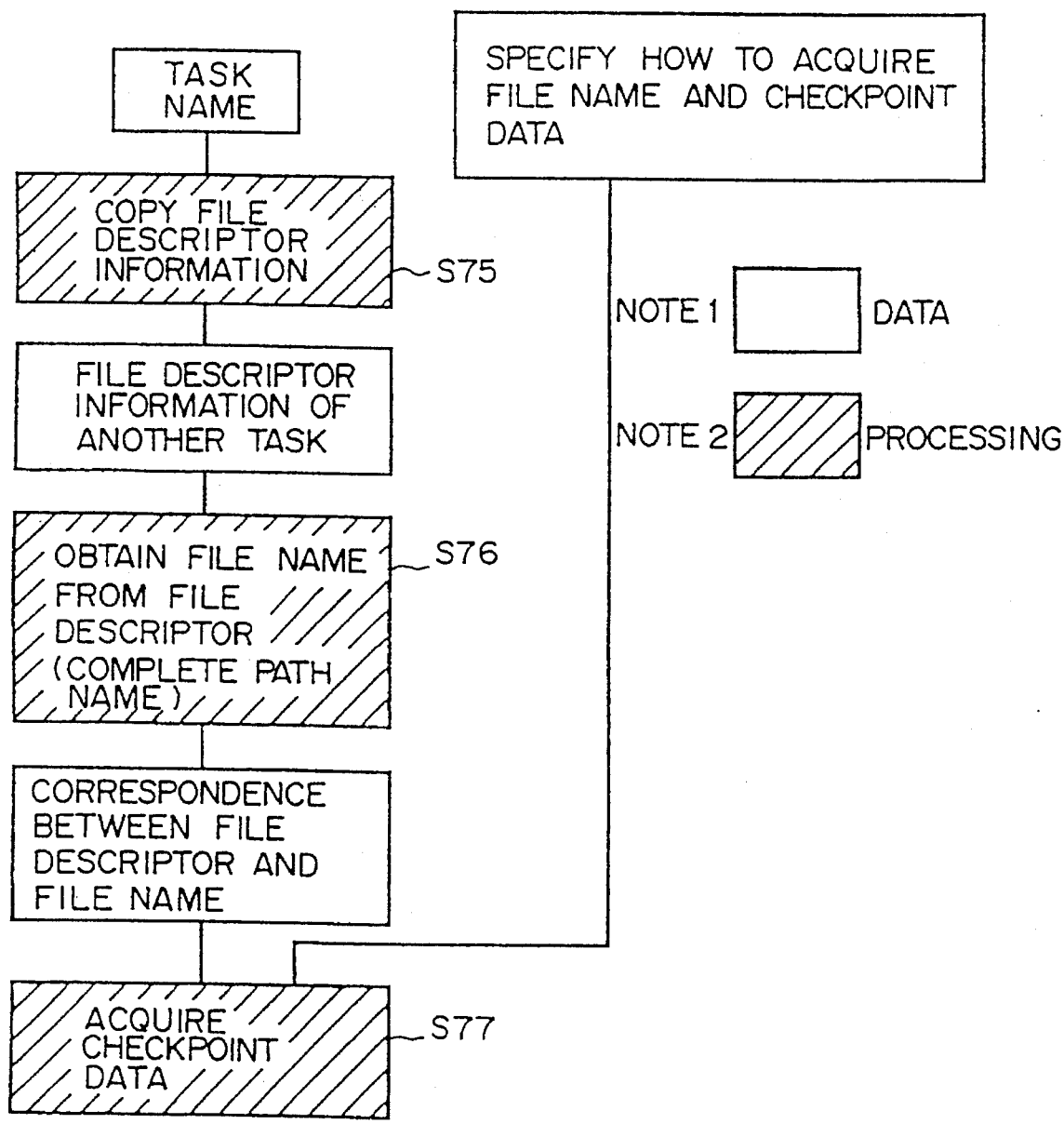
FIG. 19 illustrates file status extraction processing.

FIG. 19 is a detailed flowchart for the process of obtaining the file status. In step S75, file descriptor information is copied on the basis of the name of a checkpoint-to-be-taken task. That is, a file description management table on the checkpoint-to-be-taken task side is copied onto the checkpoint taking task side, thereby obtaining file descriptor information of another task, i.e., a checkpoint-to-be-taken task. In subsequent step S76, as described in connection with FIGS. 8 through 12, the file name is obtained from the file descriptor, thereby obtaining the complete path name of a file. That is, the complete path name is obtained as the file name corresponding to an entry number of the copied file descriptor management table, and data indicating a correspondence between file descriptors and file names. In step S77, checkpoint data is taken from files. As described above, the command analysis and the CPR file analysis permit file names and how to save and restore the file contents, i.e., an instruction on how to acquire checkpoint data. On the basis of that instruction, the process of taking checkpoint data is carried out.

On termination of the file status obtaining process of FIG. 19, the checkpoint taking task performs step S69 of FIG. 17 by which the execution of the checkpoint-to-be-taken task group is terminated or resumed. For example, if checkpoints are to be taken at the termination of work of one day, then the execution will be terminated at this point. If, on the other hand, continued execution is needed, then the execution will be resumed.

The parent and child tasks will be described in detail. In general, they are used for concurrent processing of two or more processes. For example, when two processes are performed concurrently, the parent task generates a child task so that it will carry out one of the processes. In this way, a program for carrying out a process A and a program for carrying out a process B can be executed concurrently as separate tasks.

To carry out the process A and the process B concurrently, the parent task generates a child task. The child task carries out the process A, and the parent task carries out the process B after the generation of the child task. Thus, the process A and the process B can be carried out concurrently, increasing processing efficiency.

UNIX is somewhat complicated in the way of activating a task. That is, in UNIX, the processing up to task activation is divided into a first function of generating the same task (child task) as the parent task and a second function for the child task to replace itself by a program A as inherent processing. That is, a program for carrying out another processing (A) cannot directly be generated as a child task. To generate tasks, only the method of generating the same task as the parent task can be used. Thus, it is required to first generate the same child task as the parent task and then request the generated task to replace itself with the program A for execution.

Figure 21:
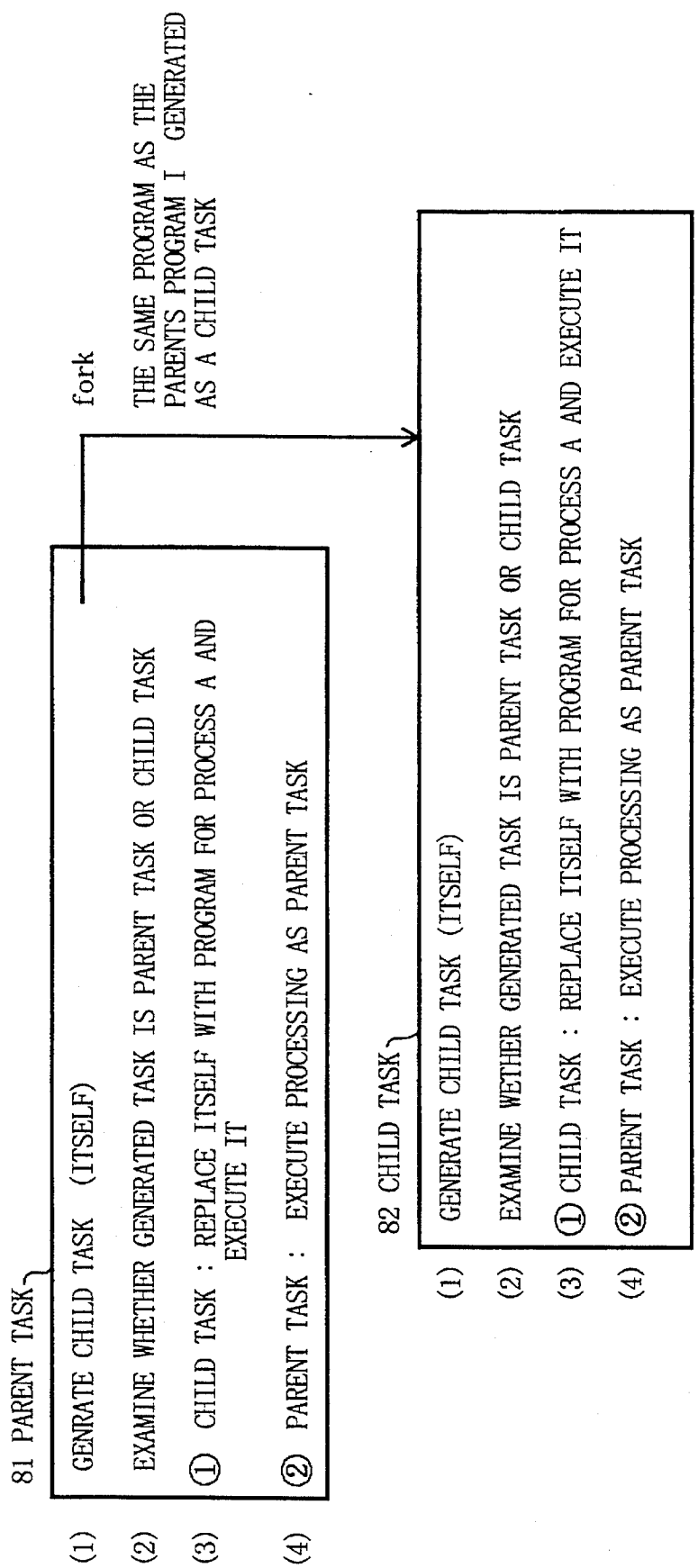
FIG. 21 is a second diagram for use in explanation of a task activation method in UNIX.

FIGS. 20, 21 and 22 illustrate the task activation method of UNIX. FIG. 20 shows two programs created so as to carry out a process A by the child task. That is, two programs 79 and 80 are generated. In program 79, a child task is generated, and as an examination of the result of the generation of the child task a decision is made as to whether the generated task is the parent task or the child task. When the decision is the child task, it is replaced by a program for carrying out the process A and the program is then executed. If the decision is the parent task, then processing as the parent task will be performed. The program 80 carries out the process A.

FIG. 21 is a diagram for use in explanation of the state at the time of execution of the parent and child tasks. The same program as the parent program is generated as a child task 82 by a system call "fork" from the parent task 81. Immediately after the generation of the child task, two identical programs each exist within a separate virtual space.

On the parent and child task sides, the two tasks are exactly identical to each other at the point of (1). Both of the programs are placed into execution by the instruction of (2). The programs are executed independently and concurrently.

On the parent task side, it is decided at (2) that the task is the parent task. Thus, the process of (3) is not executed, and the process of (4) is executed instead. That is, the process as the parent task is carried out. On the child task side, on the other hand, it is decided at (2) that the task is the child task. As a result, the process of (3) is carried out. That is, the child task replaces itself with the program for process A and then executes the program. The process of (4) is not carried out.

FIG. 22 shows the state where the child task 82 replaces itself with the program for process A and is executing it.

Figure 23:
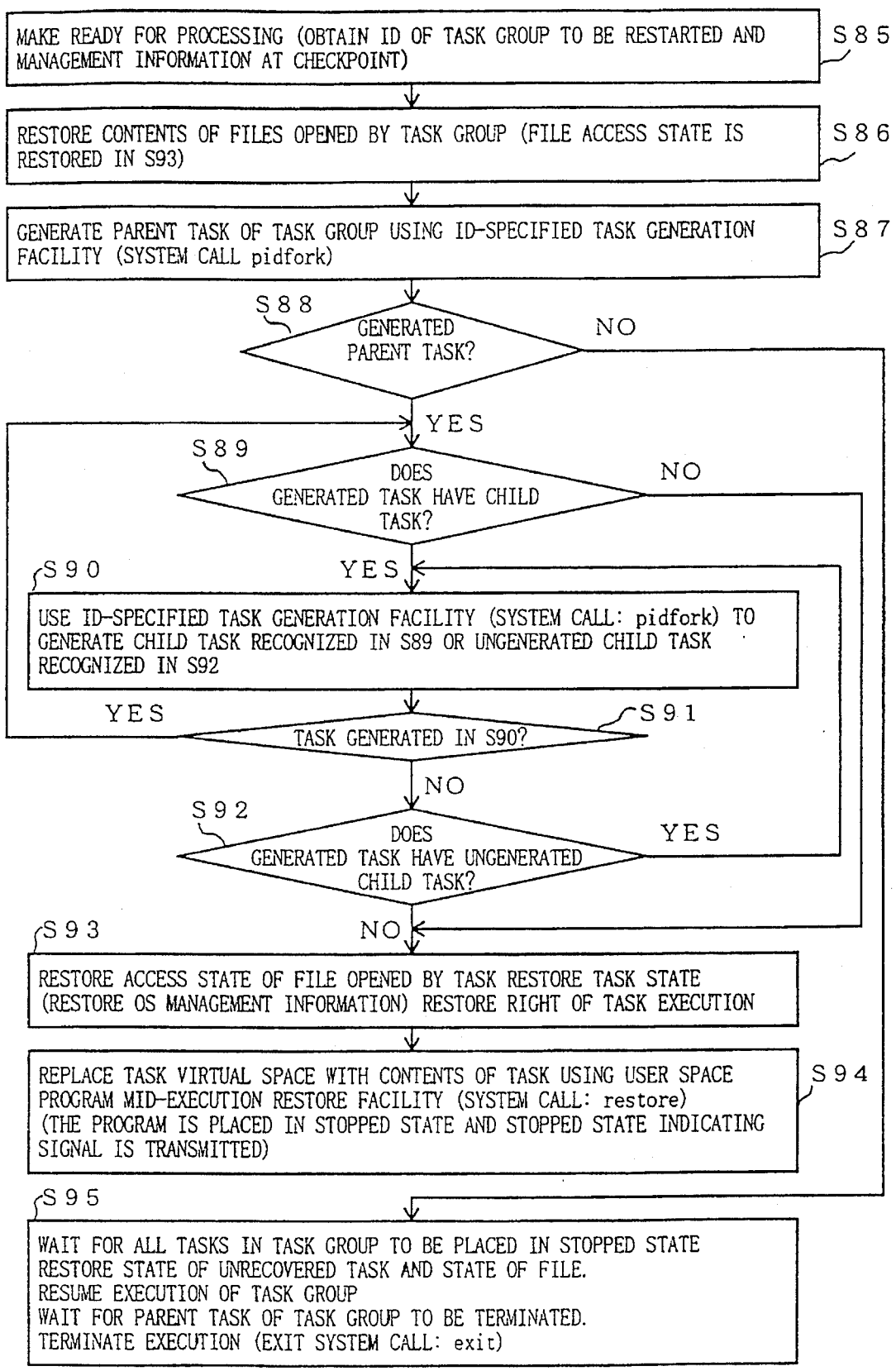
FIG. 23 illustrates restart processing.

Next, the restart procedure will be described with reference to FIG. 23. In step S85, the identified of the task group to be restarted and the management information at the point at which the checkpoint was taken are obtained to make ready for a restart. In step S86, the contents of files opened by the checkpoint-to-be-taken task group are restored. The access status of the files is restored in step S93 to be described later.

In subsequent step S87, use is made of an ID-specified task generation facility (pidfork; system call) to generate the parent task for the checkpoint-to-be-taken task group. Here, the ID-specified task generation facility is created by referring to the conventional task generation facility (fork). The fork performs allocation of new task identifiers, while the pidfork generates tasks of given identifiers. If tasks of the same identifier are operating, then a task will be generated on termination of those tasks.

The reason why the present embodiment is provided with the ID-specified task generation system call "pidfork" will be described below. The conventional system call "fork" automatically allocates a task ID to a task when it is generated by the operating system. This can make the task ID of a checkpoint-taken-and-restarted task differ from that at the point at which a checkpoint is taken. If, when the checkpoint-taken-and-restarted task performs processing by referring to its own task ID, the task ID after the execution of the checkpoint and restart processing of the present invention varies, there arises the possibility that the checkpoint-taken-and-restarted task may operate abnormally. The system call "pidfork" avoids this possibility.

Next, in step S88, a decision is made as to whether or not the task being processed is the parent task generated in step S87. If it is not the parent task, the procedure goes next to step S95. If, on the other hand, it is the parent task, the procedure next goes to step S89.

If yes in step S88, a decision is made in step S89, as to whether the generated parent task has a child task or not. If it has, this child task is generated in step S90 using the ID-specified task generation facility (pidfork). In step S91, a decision is made as to whether or not this task, i.e., the task being processed, is the task generated in step S90. If this decision is YES, the procedure returns to step S89. In this case, a decision will be made in step S89 as to whether or not the child task generated in step S90 has a child task, that is, the parent task generated in step S87 has a grandchild task.

If the decision in step S91 is NO, a decision is made in step S92 as to whether or not the task has an ungenerated child task. In the first loop, a decision is made as to whether or not the parent task generated in step S87 has another child task. If the decision is YES, the procedure returns to step S90.

If, on the other hand, there is no ungenerated child task in step S92 or if there is no child task in step S89, the procedure goes next to steps S93 and S94. In step S93, the status of access to a file opened by the task, the status of the task (OS management information) and the right of execution of the task are restored. In step S94, the mid-execution recovery facility (restore; system call) of the user space program replaces the virtual space of the task with the contents of a task. The program replaced is placed in the stopped state, and a signal indicating the stopped state is transmitted.

Here, the user space program mid-execution recovery facility (restore) is a system call which is created by referring to the conventional facility (exec) of loading a program into virtual space and executing it. The facility "exec" loads instruction parts of a program and initialization data into virtual space and then executes the program from the beginning. In the facility "restore", on the other hand, instructions and data saved at a checkpoint are read into virtual space, a program is placed in the stopped state, and then a signal is transmitted to indicate the stopped state, thereby terminating processing.

Steps S93 and S94 are performed for each of parent and child tasks generated. That is, they are each performed the number of times equal to the number of tasks in a task group to be restarted.

If the decision in step S88 is NO, step S95 is performed on the above-described to-be-restarted tasks. In step S95, the states of unrecovered tasks and files are restored after waiting for all the tasks in the to-be-restarted task group to be placed in the stopped state, that is, for step S94 to be performed on all the tasks. The states of unrecovered tasks include, for example, the contents of vector registers and "close on exec" flags. That the contents of vector registers remain unrecovered is a problem associated with packaging, not an essential problem. The "close on exec" flag is a flag that is set when a file descriptor is specified to request the system to close the corresponding file at "exec" facility execution time. The reason why this flag remains unrecovered is that the restore facility in step S94 is desired to be as close to the prior art "exec" facility as possible. However, its description is omitted.

In step S95, the execution of to-be-restarted the task group is subsequently resumed. On termination of the execution of the parent task in the to-be-restarted task group, the execution comes to an end.

In the above, an embodiment of the file name detecting method of the present invention has been described as applied to checkpoint and restart processing. In a UNIX-like operating system, each file has one attribute. Thus, it is needed to specify how each file is to be treated at checkpoint and restart time according to an individual program. The file treatment may be specified at the start of program execution or at a checkpoint. However, the most simple method for users is for a checkpoint requesting user to specify a file treatment for each file name.

To implement this method, it is required to know the names of individual files opened by a program being executed. However, the prior art UNIX has no method of knowing file names. The present invention permits the detection of file names based on file descriptors. Thus, the name of an open file can be checked with the names of a file specified by a user, allowing the user to specify how each file is to be saved and restored at checkpoint and restart time.

That is, since the user is allowed to specify how to treat an individual file when presenting a request to take checkpoints, the user can specify how to treat each file according to the system environment at the point at which a checkpoint is taken. For this reason, in comparison with the prior art in which how to treat an individual file at a checkpoint is determined at the start of job execution, the present invention can achieve greater flexibility of system implementation and is effective especially in executing lengthy jobs.

In addition, since how individual files being opened are to be treated can be specified on the basis of their respective names regardless of their attributes, more flexible system implementation can be achieved according to job operating conditions. In the prior art in which treatments of individual files are uniquely determined by their respective attributes, file treatments cannot be adapted to the nature and operating conditions of a job.

Furthermore, since the user is allowed to present a request for checkpoints using CPR files in which file treatments have been stored beforehand, the checkpoint request can be implemented by a short command regardless of the number of files to be specified.

In the Description of the Related Art in this specification, the three problems have been described with respect to the checkpoint and restart processing. The present invention can solve the first problem. That is, the present invention can easily change the checkpoint system and the restart system. More specifically, the present invention stores, at a checkpoint, the complete path names of files as file management information and the positions of access to the files as other management information, then, at restoration time, opens the files using their complete path names and restores the state of access to the files using the other management information. When requested to open the files without the use of file device and i node numbers, the operating system sets the device and i node numbers of the files appropriately. It is therefore easy to implement the checkpoint system and the restart system separately.

The second problem that temporary files cannot sometimes be saved and restored well is solved by the present invention. The present invention permits how an individual file is to be saved and restored to be specified for each file, including whether the name of each file is to be restored. Even if temporary files, including their names, need to be saved and restored, the second problem will be solved by specifying the above-described "save and restore" mode.

With respect to the third problem that the kernel of the operating system must be increased in scale so as to implement a restart program, the present invention simply implements five independent system calls as facility additions to the kernel and eliminates the need of installing the restart program in the operating system. For this reason, an increase in the scale of the operating system can be minimized.

The first system call is an extension to the existing system call "open", which is implemented by, as described in connection with FIG. 7, adding directory-oriented file management table 28 and adding a facility of storing a pointer to directory-oriented file management table 28 in task-to-file correspondence management table 5 to the conventional "open" process. The second is the system call for the directory acquisition processing described in connection with FIG. 11. The third is the system call for copying the contents of a file descriptor management table for another task described in connection with FIG. 14. The fourth is the system call "pidfork" for the ID-specified task generation facility described in connection with FIG. 23. The fifth is the system call "restore" for the user space program mid-execution recovery facility described in connection with FIG. 23.

The present invention permits files to be treated individually as specified by the user. A supplemental explanation will be made of this necessity. Of the four file treatment specification modes described above, the "append" mode can be used for a log file that is a file for recording, for example, job execution history information. The append is a concept that is already incorporated in UNIX. Depending on the usage of the conventional append facility, the checkpoint and restart processing is not always performed well. Thus, the append mode is used simply as one of the file treatment specification modes of the present invention. The "save and restore" mode is effective in solving the problem associated with temporary files as described above. The "save and copy" and "ignore" modes are conventionally existing modes.

The necessity of changing file treatments during job execution (before restart) will be further described.

In general, the "save and copy" or "save and restore" mode is specified to files that may be removed, i.e., temporary files. Such files may be removed when processing is suspended for some reason. Thus, it is necessary to take a checkpoint for saving the contents of files and restore them on restart. However, even if there is the possibility that files may be removed, they actually may not be removed. This example will be described later. When no files are removed, there is no need for using the saved contents for restoration and it will be sufficient to use files present in the system as they are. This means that the change from the "save and restore" mode to the "ignore" mode permits restore processing to be omitted.

Files which may not actually be removed, regardless of the possibility of removal include temporary files with names, for example. Suppose here that the system is implemented such that a system operator removes such temporary files with names at system startup every morning. In this case, a program requiring several days of execution will need to acquire checkpoint data before the system is shut down in the evening every day and is restarted the next morning. However, if the system operator did not remove temporary files with names, those files would be available the next day. Moreover, when it was found as the result of acquisition of checkpoint data, that the amount of temporary files was great, a request could be made to the system operator not to remove temporary files with names that day. This would prevent the save and restore processing from being performed uselessly.

In the above, the embodiment has been described as specifying file treatments for save and restart at the time a checkpoint is taken. It is also possible to further change the treatment of each file, specified at the time a checkpoint was taken, at the time of restart. This change is made by an existing command, e.g., an editor command. In general, part of information acquired by a checkpoint taking task is output to a special file called a structure file in a user-referable/changeable form (text form).

Seeing the results of the output, the user can change file treatments by the use of the editor command on his or her own responsibility. The names of files being opened, information on a file save and rest ore mode specified, such as "append" or "save and copy", information on access permission such as "read-only" or "write-only", and so on are output to the structure files.

As described above, the present invention permits programs inside and outside a task to detect the names of files corresponding to file descriptors. As a result, the task status display processing and the detection of the names of files being opened in the checkpoint and restart processing are permitted, which will contribute greatly to an improvement in the practicability of an operating system having a hierarchically structured file system.

What is claimed is:

1. A file name detecting method for use with an operating system for managing a file system having a hierarchical structure of files leading from a root node through intermediate nodes to each file serving as final nodes, said method comprising the steps of:

storing first information about an intermediate node antecedent to a file with related file identification information when opening said file;

detecting the intermediate node antecedent to said file having been opened based on the stored first information as requested by a task; and informing said task of said detected intermediate node antecedent to said file, such that said task detects a file name based on second information about said file, said second information being stored in said detected intermediate node antecedent to said file.

2. The file detecting method according to claim 1, wherein:

each intermediate node of said intermediate nodes comprises a directory;

directories have pointers pointing to each other; and said files, serving as final nodes, have pointers set only from an immediately preceding directory side.

3. The file name detecting method according to claim 1, wherein a file descriptor for a directory, which is the intermediate node antecedent to the file, is presented to said task.

4. A file name detecting method for use in a file system having a hierarchical structure, comprising the steps of:

storing a device number an i node number of a file, and a device number and a i node number of a directory to which the file belongs when the file is opened, each device number corresponding to a file descriptor of the file;

notifying a task of an i node number of a file having the file descriptor when a request to obtain the i node number is issued with the file descriptor of the file specified by the task; and obtaining a name of the file by getting information of a correspondence between the i node number and the name of the file belonging to the directory with the file descriptor of the directory specified, and by retrieving information of the directory according to the i node number of the file obtained in response to the request to obtain the i node number.

5. A file name detecting method for use with an operating system for managing a file system having a hierarchical file system leading from a root node through intermediate nodes to each file of files as a final node, said intermediate nodes comprising directories, and said files and said directories being specified by corresponding respective i node numbers, said method comprising the steps of:

creating a file management table, at file open processing time, for storing an i node number of one of said file, when specified and a directory-oriented file management table for storing an i node number of a directory antecedent to said specified file;

creating a first task-to-file correspondence table for storing pointers to said file management table and said directory-oriented file management table;

creating a file descriptor management table for storing a pointer to said first task-to-file correspondence management table, an entry number of said file descriptor management table being allocated to said file as a file descriptor; and providing for a task that requested to open said file of said entry number of said file descriptor management table as a file descriptor of said file being opened.

6. The file name detecting method according to claim 5, further comprising the steps of:

obtaining, at the time said task specifies said file descriptor to make a request for directory acquisition, said first task-to-file correspondence management table based on said pointer corresponding to said file descriptor specified in said file descriptor management table;

obtaining said directory-oriented file management table based on said first task-to-file correspondence management table;

creating a second task-to-file correspondence management table that directly points to said directory-oriented file management table;

storing a pointer to said second task-to-file correspondence management table in said file descriptor management table by adding an entry to said second task-to-file; and informing said task of the entry number of said entry added to said file descriptor management table as a file descriptor for a directory antecedent to said file.

7. The file detecting method according to claim 5, further comprising the step of copying, when a second task makes a request to detect the name of said file opened by said task, information containing said file descriptor of said file opened by said task as management information of said second task.

8. The file name detecting method according to claim 5, further comprising the steps of:

obtaining, at the time when a second task makes a request to detect the name of said file opened by said task, said first file descriptor management table for said task based on a name of said task;

copying contents of said first file descriptor management table into a second file descriptor management table created for said second task;

creating a third task-to-file correspondence management table for storing pointers to said file management table and said directory-oriented file management table;

entering a pointer to said third task-to-file correspondence management table into said second file descriptor management table; and informing said second task of an entry number of said pointer to said third task-to-file correspondence management table in said first file descriptor management table as a file descriptor of said file being used by said first task.

9. A computer system comprising an operating system for managing a file system having a hierarchical structure leading to a root node through intermediate nodes to files serving as final nodes and a task operating on said operating system, said operating system comprising:

intermediate node storage means for storing a directory antecedent to a file specified by said task to correspond with a file descriptor of said file; and intermediate node detecting means for, when the file descriptor is specified, detecting an intermediate node corresponding to said file descriptor in said intermediate node storage means to inform said task of the detected intermediate node, and said task comprising:

request means for requesting that said operating system detect an intermediate node antecedent to a file by specifying its file descriptor; and means for obtaining a name of said file from stored information of said intermediate node detected by said intermediate node detecting means of said operating system as requested by said requesting means.

10. The computer system according to claim 9, wherein said intermediate node storage means of said operating system creates, at the time when a file specified is opened, a file management table for storing an i node number of said file specified, a directory-oriented file management table for storing an i node number of a directory antecedent to said file, a first task-to-file correspondence management table for storing pointers to said file management table and said directory-oriented file management table, and a file descriptor management table for storing a pointer to said first task-to-file correspondence table;

said intermediate node detecting means informs said task of a corresponding entry number in said file descriptor management table as a file descriptor of said file;

said intermediate node storage means obtains, at the time when a request is made by said requesting means of said task to acquire a directory antecedent to said file by specifying said file descriptor, said first task-to-file correspondence management table based on a pointer corresponding to said file descriptor specified in said file descriptor management table, obtains said directory-oriented file management table based on said first task-to-file correspondence management table, and creates a second task-to-file correspondence management table that directly points to said directory-oriented file management table, adding an entry to said file descriptor management table as a pointer to said second task-to-file correspondence management table; and said intermediate node detecting means informs said task of an entry number of said entry added to said file descriptor management table as a file descriptor of a directory antecedent to said file.

* * * * *